United States Patent
Narasingarayanapeta et al.

(10) Patent No.: US 11,797,491 B2
(45) Date of Patent: Oct. 24, 2023

(54) INOFILE MANAGEMENT AND ACCESS CONTROL LIST FILE HANDLE PARITY

(71) Applicant: NetApp Inc., San Jose, CA (US)

(72) Inventors: Krishna Murthy Chandraiah setty Narasingarayanapeta, Bangalore (IN); Harsha Handral Sridhara, Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/509,033

(22) Filed: Oct. 24, 2021

(65) Prior Publication Data
US 2022/0043777 A1     Feb. 10, 2022

Related U.S. Application Data

(63) Continuation of application No. 16/357,387, filed on Mar. 19, 2019, now Pat. No. 11,157,455.

(51) Int. Cl.
*G06F 16/178*     (2019.01)
*G06F 21/62*      (2013.01)

(52) U.S. Cl.
CPC ........ *G06F 16/178* (2019.01); *G06F 21/6218* (2013.01)

(58) Field of Classification Search
CPC ... G06F 16/178; G06F 21/6218; G06F 16/176
USPC ............................................. 707/611
See application file for complete search history.

(56) References Cited

U.S. PATENT DOCUMENTS

| | | |
|---|---|---|
| 6,480,970 B1 | 11/2002 | DeKoning et al. |
| 7,506,111 B1 | 3/2009 | Hamilton |
| 7,653,668 B1 | 1/2010 | Shelat et al. |
| 8,671,072 B1 | 3/2014 | Shah et al. |
| 9,848,043 B2 | 12/2017 | Kimmel et al. |
| 9,971,657 B2 | 5/2018 | Prahlad et al. |
| 10,852,985 B2 | 12/2020 | Narasingarayanapeta |
| 11,086,551 B2 | 8/2021 | Narasingarayanapeta |
| 11,151,162 B2 | 10/2021 | Narasingarayanapeta |
| 11,157,455 B2 | 10/2021 | Narasingarayanapeta |
| 11,449,260 B2 | 9/2022 | Narasingarayanapeta |
| 2001/0039548 A1 | 11/2001 | Shinkai et al. |
| 2003/0225760 A1 | 12/2003 | Ruuth et al. |

(Continued)

OTHER PUBLICATIONS

"Spanner: Google's Globally-DistributedDatabase", 2012, J.C. Corbett et al., 10th USENIX Symposium on Operating Systems Design and Implementation (OSDI '12), URL: https://www.usenix.org/system/files/conference/osdi12/osdi12-final-16.pdf, 14 pgs.

(Continued)

*Primary Examiner* — Michael Pham
(74) *Attorney, Agent, or Firm* — COOPER LEGAL GROUP, LLC

(57) ABSTRACT

Techniques are provided for inofile management and access control list file handle parity. For example, operations targeting a first storage object of a first node are replicated to a second storage object of a second node. A size of an inofile maintained by the second node is increased if an inode number to be allocated by the replication operation is greater than a current size of the inofile. Access control list file handle parity is achieved by maintaining parity between inode number and generation number pairings of the first node and the second node.

20 Claims, 17 Drawing Sheets

(56) References Cited

U.S. PATENT DOCUMENTS

| | | |
|---|---|---|
| 2007/0185937 A1 | 8/2007 | Prahlad et al. |
| 2008/0270461 A1 | 10/2008 | Gordon et al. |
| 2011/0208931 A1 | 8/2011 | Pendharkar et al. |
| 2013/0275541 A1 | 10/2013 | Wang et al. |
| 2014/0032957 A1 | 1/2014 | Beeson et al. |
| 2016/0092539 A1 | 3/2016 | Compton et al. |
| 2016/0371319 A1 | 12/2016 | Park et al. |
| 2017/0031939 A1 | 2/2017 | Wenzel |
| 2017/0161150 A1 | 6/2017 | Rosin et al. |
| 2017/0185326 A1 | 6/2017 | Meiri et al. |
| 2017/0249222 A1* | 8/2017 | Patnaik ................ G06F 3/0689 |
| 2018/0004829 A1 | 1/2018 | Kathuria et al. |
| 2018/0260125 A1 | 9/2018 | Botes et al. |
| 2020/0042536 A1 | 2/2020 | Kaushik et al. |
| 2020/0025014 A1 | 8/2020 | Liu et al. |
| 2021/0365187 A1 | 11/2021 | Narasingarayanapeta |
| 2022/035837 A1 | 2/2022 | Narasingarayanapeta |
| 2023/0012754 A1 | 1/2023 | Narasingarayanapeta |

OTHER PUBLICATIONS

International Search Report and Written Opinion for PCT Application No. PCT/US2020/018557 dated Jun. 9, 2020, 13 pages.
International Preliminary Report on Patentability for Application No. PCT/US2020/018557 dated Sep. 16, 2021, 8 pages.
Notice of Allowance dated Apr. 5, 2023 for U.S. Appl. No. 17/396,796, filed Aug. 9, 2021, 7 pages.
Notice of Allowance dated Jun. 14, 2023 for U.S. Appl. No. 17/396,796 filed Aug. 9, 2021, 05 pages.
Co-pending U.S. Appl. No. 18/308,737 dated Apr. 28, 2023.

\* cited by examiner

INOFILE MANAGEMENT AND ACCESS CONTROL LIST FILE HANDLE PARITY

RELATED APPLICATIONS

This application claims priority to and is a continuation of U.S. application Ser. No. 16/357,387, filed on Mar. 19, 2019, titled "INOFILE MANAGEMENT AND ACCESS CONTROL LIST FILE HANDLE PARITY," which is incorporated herein by reference.

BACKGROUND

Many storage environments provide synchronous replication where operations targeting a first storage object are replicated to a second storage object that may be maintained as a replicated backup of the first storage object. For example, an operation targeting the first storage object may be received by a first node that stores the first storage object. The operation is "split" to create a replication operation that is a replication of the operation. The operation and the replication operation are synchronously replicated, such as by locally executing the operation upon the first storage object by the first node and transmitting the replication operation to the second node for execution (e.g., parallel execution) upon the second storage object. An acknowledgment of success of the operation is transmitted back to a client that generated the operation based upon both the operation and the replication operation being acknowledged by the first node and the second node.

DETAILED DESCRIPTION

Figure 1:
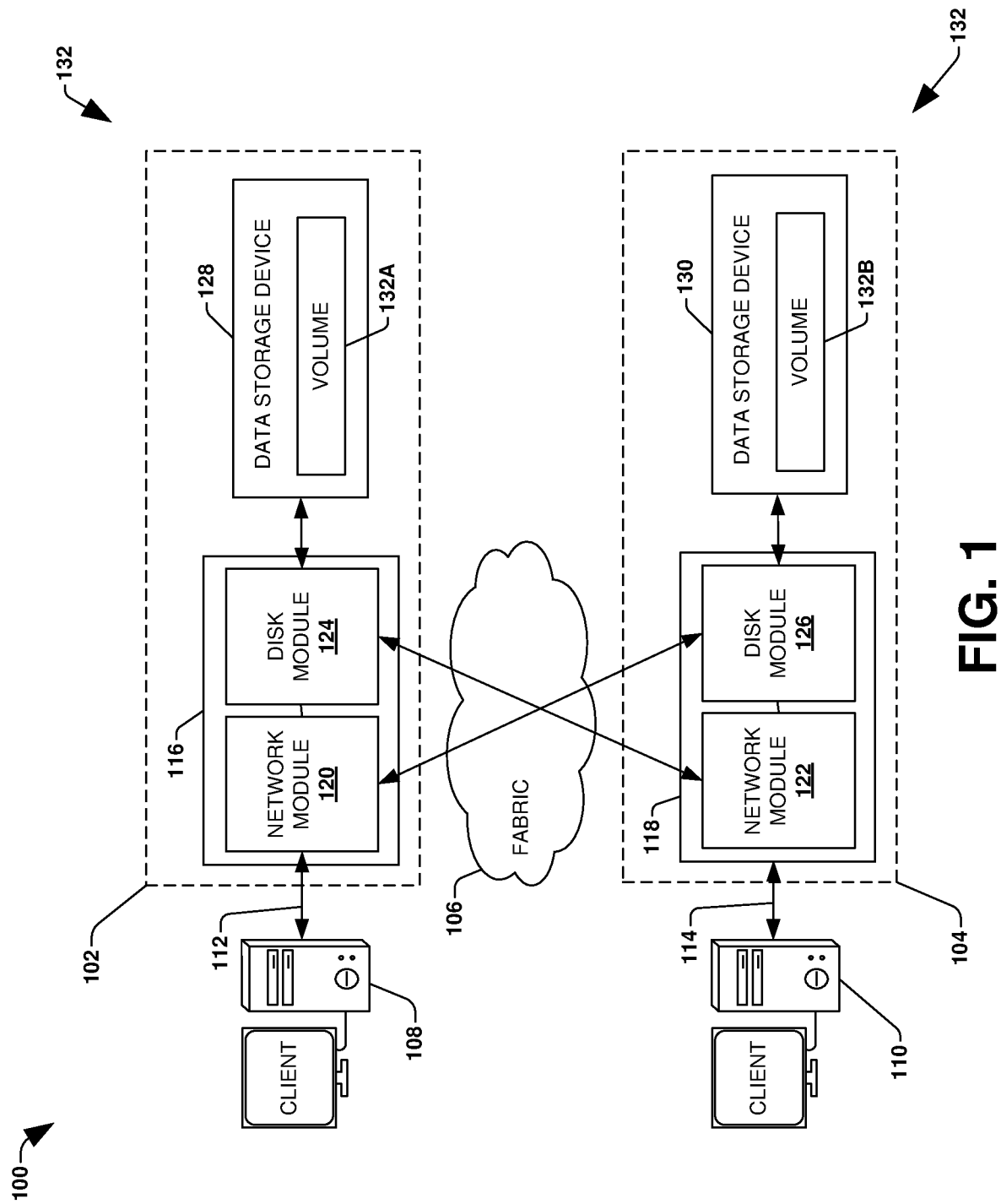
FIG. 1 is a component block diagram illustrating an example clustered network in which an embodiment of the invention may be implemented.

The methods and systems provided herein improve replication, such as synchronous replication techniques. Synchronous replication can be implemented as a zero recovery point objective (RPO) replication engine that can provide zero data loss in the event a node fails in a computing environment. This is achieved by intercepting I/O targeting a first storage object (e.g., a first volume, file, directory, storage virtual machine, logical unit number (LUN), etc.) and replicating (splitting) the I/O to create replicated I/O that is executed (synchronously replicated) upon a second storage object that is maintained as a replica of the first storage object. Parallel splitting is performed where an operation is dispatched to both a first node hosting the first storage object and a second node hosting the second storage node in parallel. This reduces latency compared to merely sequentially splitting operations where a replication operation is dispatched to the second node only after completion of a corresponding operation by the first node.

A quick reconciliation (quick reconcile) can be performed if a parallel split replication operation succeeded at the second node but a corresponding operation fails at the first node. The quick reconciliation will undo the replication operation at the second node using old data from the first node before responding with a failure. In this way, the first storage object and the second storage object will be consistent in that they both will comprise the same old data. A failure message is returned to the client device because the operation and the replication operation were not fully executed and committed to write the new data to the first storage object and the second storage object. Issues can arise when performing the quick reconciliation, such as where the second node loses a hole reservation flag due to data being written to the second storage object during the quick reconciliation. Accordingly, as will be described in further detail, hole reservation flags at the first node are conveyed to the second node during the quick reconciliation.

A transition operation can be performed to provide non-disruptive re-synchronization between the first node and the second node. The transition operation uses a dirty region log to track dirty regions of the first storage object modified by data operations such as Write during the transition phase and a metadata log to track metadata operations executed during the transition phase. Dirty data (e.g., modified data of the first storage object not yet replicated to the second storage object) as identified by the dirty region log and metadata operations as logged by the metadata log are applied to the second node to bring the first storage object and the second storage object into a synchronous replication relationship. Metadata operations are first replicated from the metadata log, and then the dirty data is replicated. Issues can arise during the transition operation because operations (e.g., dirty data) may not be replicated to the second node according to the order executed upon the first node, and that the dirty region log lacks details about which flags, such as a hole reservation flag, were part of which write operations that created the dirty data. Accordingly, as will be described in further detail, hole reservation flags are replicated to the second node during the transition operation in order to preserve persistent hole reservations.

In an embodiment, timestamp consistency is provided between the first node and the second node during parallel splitting of operations. Replicating the timestamp information to the second node in a consistent matter is useful because the timestamp information can be used by the second node to perform data integrity validation, incremental backups, etc. A splitter component is configured to intercept operations before such operations reach a file system or operating system of the first node. The splitter component is configured to split (replicate) an operation to create a replication operation. Generally, a timestamp is assigned using a get time of day function when the operation is executed in order to set an mtime and/or ctime of storage objects modified by the operation. However, with parallel splitting, the second node will not know what time the first node used. Accordingly, the splitter component assigns a same timestamp to both the operation and the replication operation so that the same timestamp value is used by both the first node and the second node. The operation and the replication operation are executed on the storage objects on the first node and the second node. If the timestamp assigned to the replication operation is larger than a current timestamp of the second storage object, then the timestamp is assigned as a new current timestamp for the second storage object (otherwise the timestamp is not assigned). If the timestamp assigned to the operation is larger than a current timestamp of the first storage object, then the timestamp from the operation is assigned as a new current timestamp for the first storage object (otherwise the timestamp is not assigned).

In an embodiment, an inofile of the second node (e.g., a volume on-disk inofile comprising inode information of storage objects maintained by the second node) is grown on-demand (e.g., when necessary) when an inode number beyond a current inofile size is needed to be allocated by a replication operation, such as a create operation. The inofile can be grown by a unit that is a chunk of inodes, such as multiple inodes, in order to efficiently utilize storage space and avoid frequent path length increase operations.

In an embodiment, access control list (ACL) file handle parity is provided between the first node and the second node to avoid inode map lookups at the second node in order to avoid increased latency incurred by such lookups. The ACL file handle parity corresponds to maintaining parity between inode number and generation number pairings used to reference storage objects (e.g., used as file handles to access storage objects). Access control lists may be implemented as files in public inode space. Access control lists specify access control entities (ACEs) as content. An access control list allows an external entity, such as a client, to specify access control and permissions for storage objects hosted by nodes. An incoming operation will specify access control entities. The first node attempts to locate an existing access control list inode with the same access control entities. If an access control list inode is found, then the access control list inode is used, otherwise, a new access control list inode is created (e.g., a new file handle is created/allocated). An access control list inode may correspond to a file handle for a storage object, which is comprised of an inode number and generation number. Access control list file handle information is replicated from the first node to the second node in order to achieve parity. If the first node shared or allocated an access control inode number, then the second node will do the same.

In an embodiment, operations are replicated to the second node when such operations result in on-disk modifications. Operations that do not result in on-disk modifications are not replicated to the second node to save network bandwidth and CPU cycles of the second node. That is, if an operation results in an on-disk modification by the first node, then the operation will be replicated to the second node for execution. Otherwise, the operation will not be replicated. In an example, certain operations such as open, close, set attribute (e.g., set a delete on close flag in an in-memory lock), and/or a write with a zero payload will not result in an on-disk modification, and thus will not be replicated.

In an embodiment, punched holes are replicated from the first node to the second node. That is, the first node may hole punch unused data blocks of the first storage object so that the unused data blocks can be returned to a storage array for storing other data. While in a steady state of synchronous replication, it may be easy to merely forward punch hole operations to the first node and the second node for freeing unused data blocks back to the storage array. However, issues can occur during a transition operation where operations are not being replicated in the order of execution on the first node, and thus a hole punch operation could attempt to free a block that is beyond an end of the second storage object and will fail. Accordingly, when the hole punch operation fails at the second node, then hole punch operation is returned to a replication layer thread at the second node that will issue a write to the block targeted by the hole punch (e.g., a last block number as specified by the hole punch) in order to grow the second storage object so that the hole punch operation can be re-issued. The re-issued hole punch operation will succeed because the second storage object has been grown to encompass the last block number targeted by the hole punch operation.

In an embodiment, hole reservations are replicated between the first node and the second node. Common internet file system (CIFS) applications may reserve storage space within storage objects before writing to the storage objects. Certain operations, such as writes and set attributes, can cause persistent hole reservations being on or off based on a hole reservation flag. However, details of the hole reservation flag can be lost during a transition operation because operations are not replicated in order and the dirty region log does not have details of the hole reservation flag which can be lost.

During the transition operation, hole reservation flags of operations targeting the first storage object are replicated within replication operations targeting the second storage object so that the hole reservation flags are not lost at the second node. In an example, a component (e.g., a read handler, a set attribute handler, etc.) will detect if an inode has a hole reservation flag, and will set a space reservation attribute that is transmitted to the second node to reserve corresponding storage space within the second storage object. For a dirty region log induced read, if a hole reservation flag is set on the first object, then the hole reservation flag is set for a write being sent to the second storage node to reserve corresponding storage space within the second storage object.

During the transition, a source side set attribute operation will detect if the first object has a hole reservation flag. If the first object has the hole reservation flag, then the set attribute operation, to be queued in the metadata log, will contain a flag to turn the hole reservations on. When the set attribute operation is replicated and executed on the second storage object, the object will also have hole reservations turned on.

During the quick reconciliation, read operations to the second node are modified to convey a presence of hole reservation flags. The resultant Write and PunchHole operations to the second node are modified to set reservation flags if inodes at the first node had the hole reservation flags. In this way, hole reservation flags are conveyed to the second node so that the second node can reserve storage space within the second storage object corresponding to reserved storage space within the first storage object.

In an embodiment, file access permission policy flags (fpolicy flags) are handled without going out of sync (e.g., without transition from a synchronous replication state to an asynchronous replication state). In an example, when an fpolicy is configured, operations may carry fpolicy flags, which could be failed with a specific error back to an external fpolicy server for further screening. Once cleared, an operation is sent back to the file system without the fpolicy flag. Because of parallel splitting of write operations, failure of the write operations will trigger a quick reconciliation that would take the synchronous replication relationship out of sync if the reconciliation is not fast enough. Accordingly, write operations having fpolicy flags are sequentially replicated to the second node, as opposed to being replicated in parallel. This avoids potential quick reconciliations from being triggered. Writes without fpolicy flags will continue to use parallel split for lower latency.

In an embodiment, composite zombie handling is supported. CIFS supports multiple data streams for a file/directory, where more than one data stream is associated with a filename (e.g., a name of the first storage object). When a file system of the first node unlinks/deletes a storage object which has associated data streams, a base is deleted and the unlink operation completes immediately. The remaining storage objects are deleted later when a composite zombie handler processes the storage objects. However, the composite zombie handler at the first node can be fast, but is slow at the second node. If an inode number is freed and reused by a create operation at the first node, then the inode number may not yet be freed at the second node by a composite zombie handler process hosted by the second node. This will cause the replication operation to fail. To avoid the failure, the inode at the second node is hijacked. If the inode is a leaf inode, then the inode is freed up and the inode number is used immediately for a replicated create operation. If the inode is a stream directory, then the streams are moved under a new private inode and the inode is released.

To provide for the techniques provided herein, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that techniques provided herein may be implemented within the clustered network environment 100. It may be appreciated that techniques provided herein may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
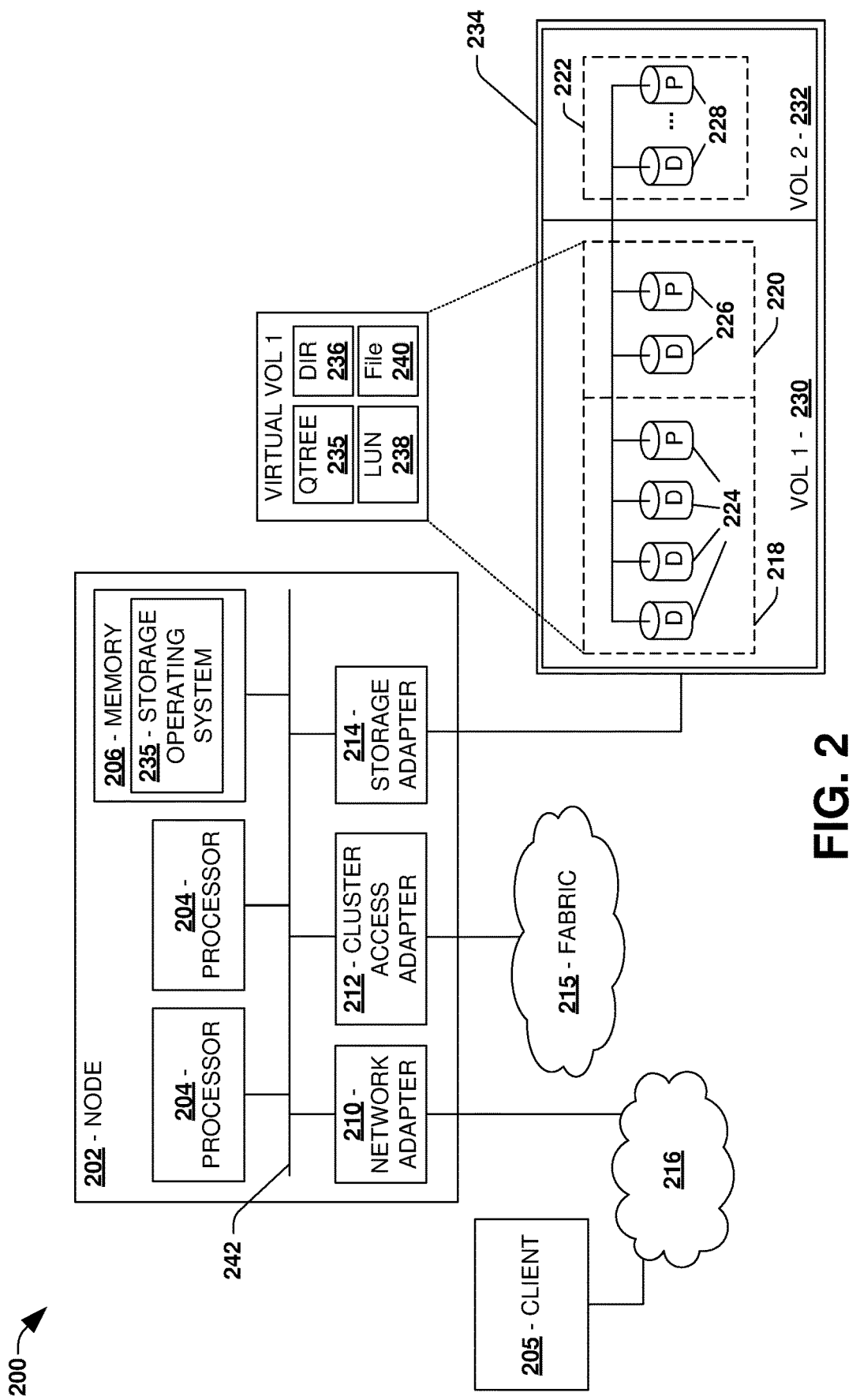
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices.

The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that techniques provided herein may be implemented for the data storage system 200. It may be appreciated that techniques provided herein may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
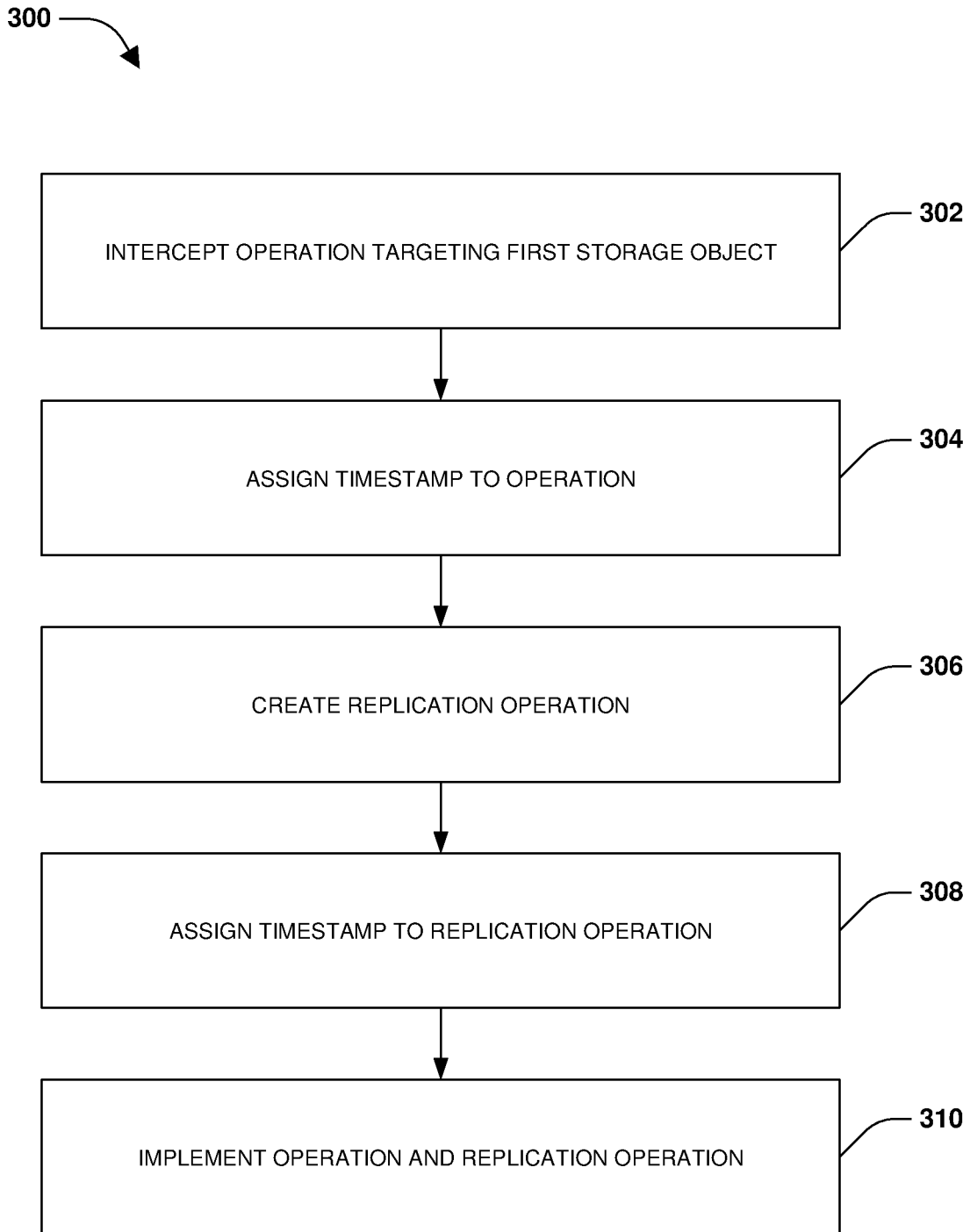
FIG. 3 is a flow chart illustrating an example method for timestamp consistency.
Figure 4A:
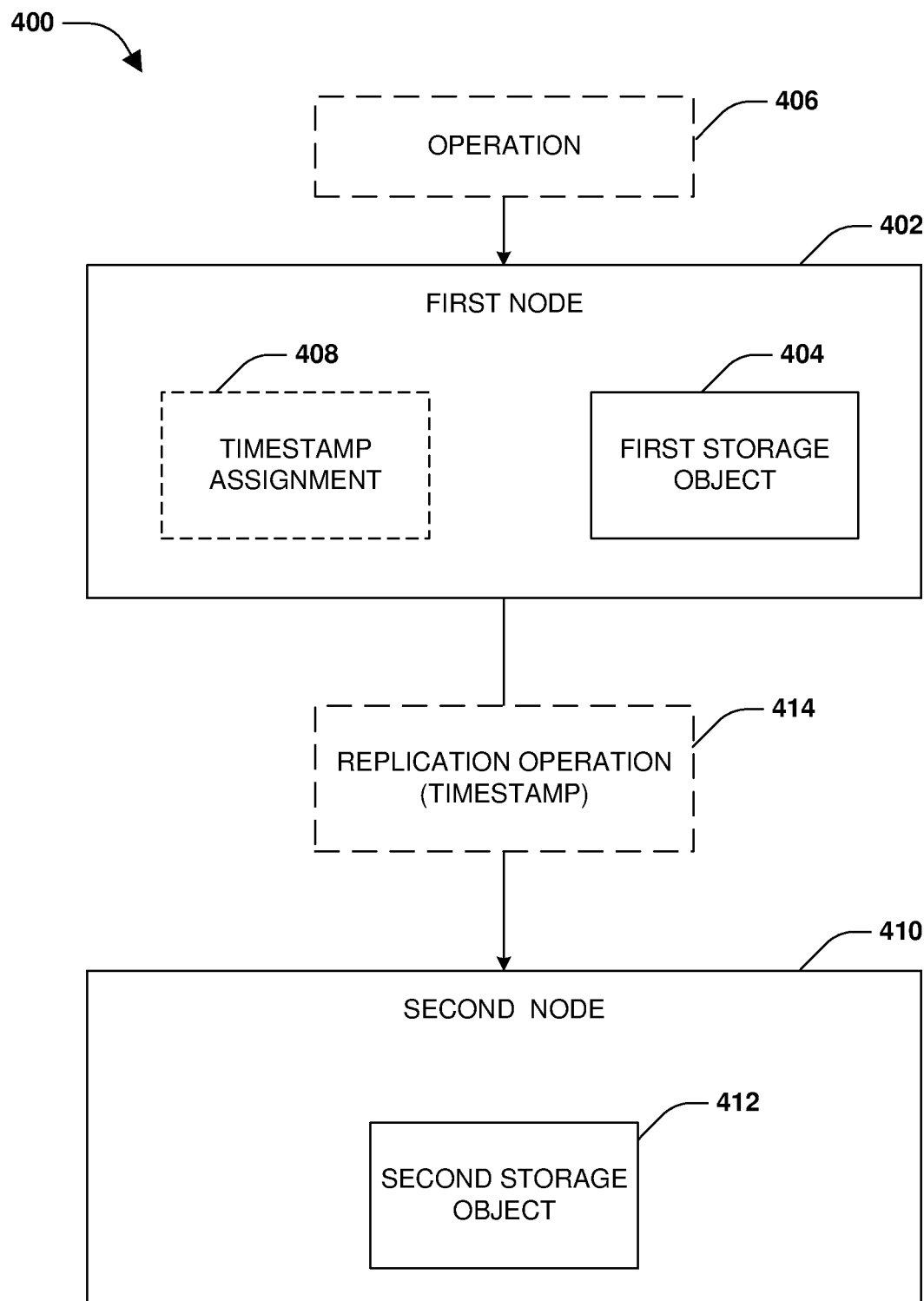
FIG. 4A is a component block diagram illustrating an example system for timestamp consistency, where timestamp consistency is provided for an operation and a replication operation.
Figure 4B:
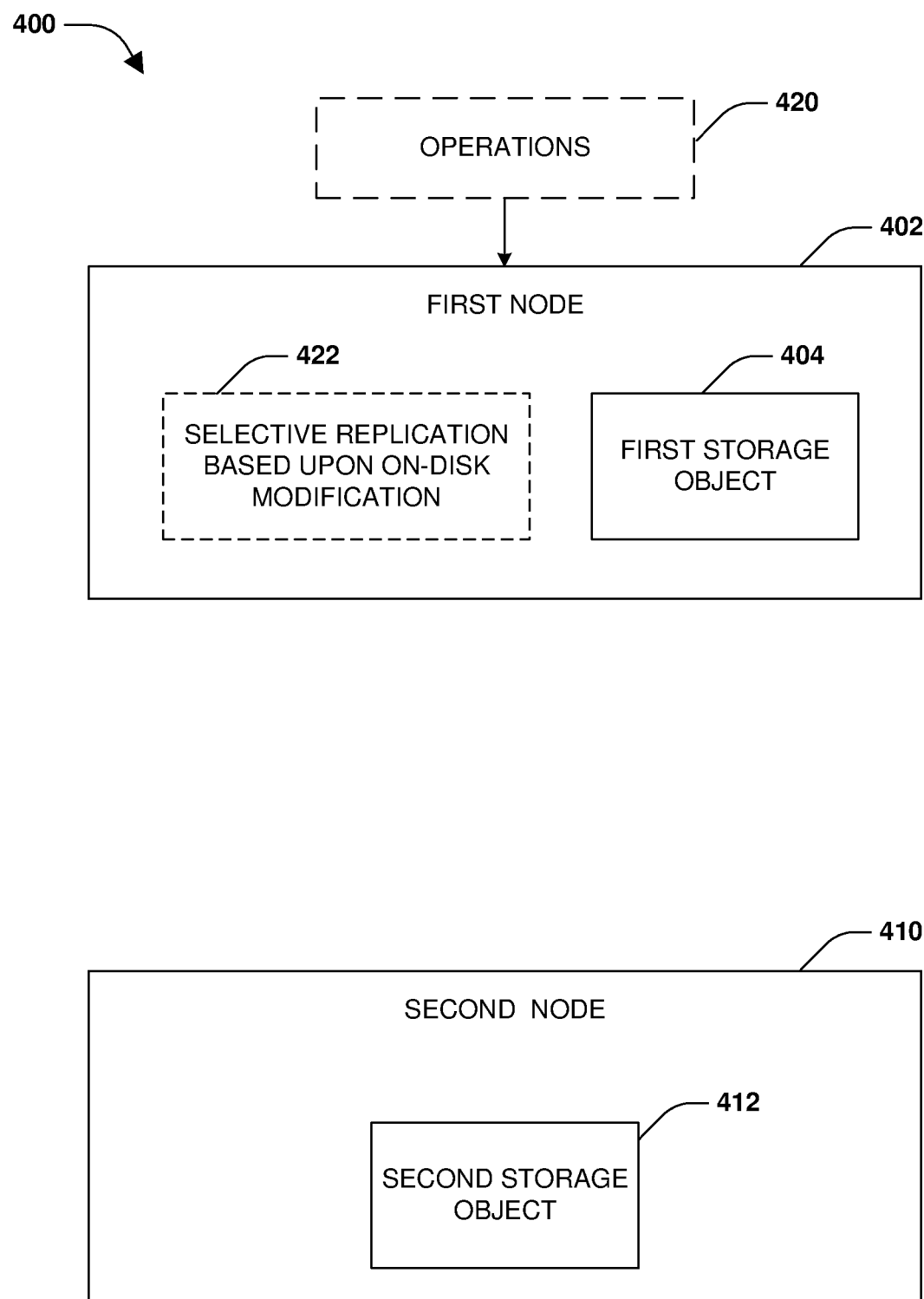
FIG. 4B is a component block diagram illustrating an example system for timestamp consistency, where selective replication of operations is performed based upon whether the operations result in on-disk modifications.
Figure 4C:
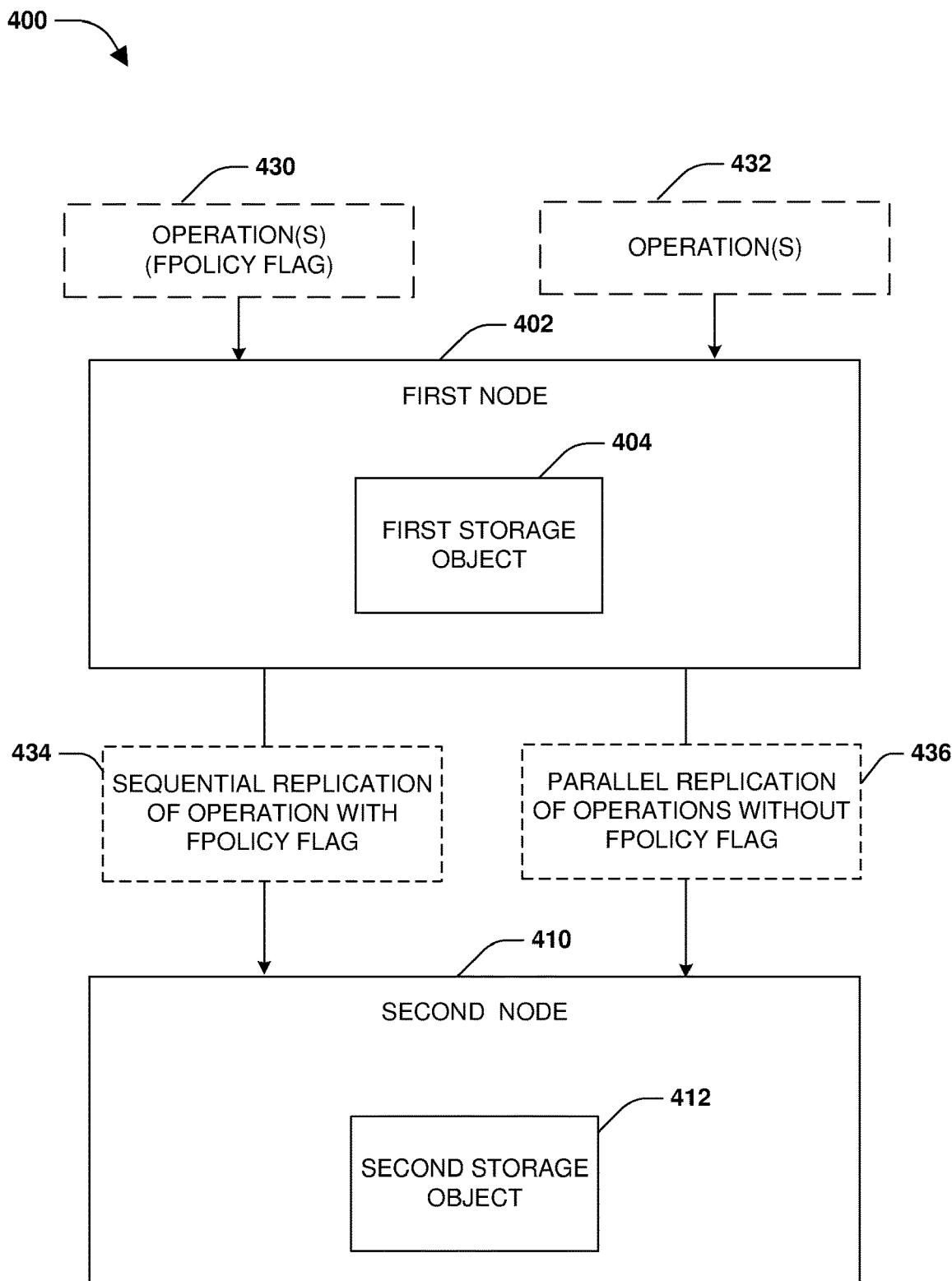
FIG. 4C is a component block diagram illustrating an example system for timestamp consistency, where sequential replication of operations with an fpolicy flag is performed.

One embodiment of timestamp consistency is illustrated by an exemplary method 300 of FIG. 3 and further described in conjunction with system 400 of FIGS. 4A-4C. A first node 402 (e.g., a storage controller, a storage server, a computing device, a storage service, or any other hardware or software capable of storing data) may store a first storage object 404 (e.g., a file, a LUN, a storage virtual machine, a volume, a consistency group, a directory, or any other set of data), as illustrated by FIG. 4A. The first storage object 404 may have a synchronous replication relationship with a second storage object 412 stored by a second node 410. The second storage object 412 may be maintained as a replica of the first storage object 404. A splitter component is configured to replicate operations targeting the first storage object 404 to the second storage object 412. In particular, the splitter component is configured to intercept operations before such operations reach a file system or operating system of the first node 402. The splitter component is configured to split (replicate) an operation to create a replication operation that is transmitted to the second node 410 for execution upon the second storage object 412. The operation is only acknowledged back to a device that sent the operation to the first node 402 once execution and replication of the operation are acknowledged.

Timestamps (e.g., a modify timestamp, a create timestamp) are usually assigned to storage objects and/or update by the nodes based upon when operations and replication operations are executed upon the storage objects. Replicating the timestamp information to the second node 410 in a consistent matter is useful because the timestamp information can be used by the second node 410 to perform data integrity validation, incremental backups, etc. Generally, a timestamp is assigned using a get time of day function when an operation (e.g., a write operation, a create operation, etc.) is executed in order to set an mtime and/or ctime of storage objects modified by the operation. However, with parallel splitting the second node 410 will not know what time the first node 402 used. This results in timestamp inconsistency between the first storage object 404 and the second storage object 412.

Accordingly, as provided herein, the splitter component assigns 408 a same timestamp to both the operation and the replication operation so that the same timestamp value is used by both the first node 402 and the second node 410. For example, the first node 402 receives an operation 406 from a device, such as a write operation that is to modify the first storage object 404, at 302. At 304, the splitter component assigns a timestamp to the operation. At 306, the splitter component creates a replication operation 414 that is a replication of the operation 406. At 308, the splitter component assigns 408 the same timestamp to the replication operation 414 that the splitter component assigned to the operation 406.

At 310, the operation 406 is implemented upon the first storage object 404 by the first node 402 and the replication operation 414 is replicated to the second node 410 for implementation upon the second storage object 412. A file system operation handler of the first node 402 is reconfigured to use the timestamp assigned to the operation 406 by the splitter component instead of creating and using a new timestamp corresponding to a time that the operation 406 is executed by the first node 402. A file system operation handler of the second node 410 is reconfigured to use the timestamp assigned to the replication operation 414 by the splitter component instead of creating and using a new timestamp corresponding to a time that the replication operation 414 is executed by the second node 410.

If the timestamp assigned to the replication operation 414 is larger than a current timestamp of the second storage object 412, then the timestamp is assigned as a new current timestamp for the second storage object 412 (otherwise the timestamp is not assigned). If the timestamp assigned to the operation 406 is larger than a current timestamp of the first storage object 404, then the timestamp from the operation 406 is assigned as a new current timestamp for the first storage object 404 (otherwise the timestamp is not assigned).

FIG. 4B illustrates the first node 402 selectively replicating 422 certain operations 420 to the second node 410 for execution. In an embodiment, operations are replicated from the first node 402 to the second node 410 when such operations result in on-disk modifications. Otherwise, operations that do not results in on-disk modifications are not replicated to the second node 410 and are merely locally executed at the first node 402 to save network bandwidth and CPU cycles of the second node 410. That is, if an operation results in an on-disk modification by the first node 402 (e.g., naming an object, deleting an object, write data or metadata to storage, creating a new object, or any other operation that results in creating or modifying data within storage), then the operation will be replicated to the second node 410 for execution. Otherwise, the operation will not be replicated. In an example, certain operations such as an open operation (e.g., opening a file), a close operation (e.g., closing the file), a set attribute operation (e.g., set a delete on close flag in an in-memory lock), and/or a write with a zero payload will not result in an on-disk modification, and thus will not be replicated.

FIG. 4C illustrates the first node 402 and the second node 410 sequentially replicating operations having file access permission policy flags (fpolicy flags). In an example, an fpolicy is configured by a client that stores data within a storage environment comprising the first node 402 and the second node 410. The fpolicy allows external client applications to connect to the storage environment in order to monitor and set file access permissions. The file access permissions may correspond to how to handle create operations, open operations, rename operations, delete operations, along with permission for certain types of files and whether a client application (e.g., an fpolicy server that screens operations with fpolicy flags) is to be notified of a remote device attempting to execute an operation to access a storage object. When an operation with the fpolicy flag is received by a file system, the operation may be failed back to the fpolicy server for screening to see whether the operation is allowed (e.g., the file system fails operations back to the fpolicy server if the operations have the fpolicy flag). Upon the remote device being cleared by the fpolicy server for accessing the storage object, the operation is sent without the fpolicy flag to the file system for execution. The operation does not have the fpolicy flag so that the file system will not fail the operation.

Because of parallel splitting of write operations, failure of the write operations will trigger a quick reconciliation that would take the synchronous replication relationship between the first node 402 and the second node 410 (e.g., between the first storage object 404 and the second storage object 412) out of sync if the quick reconciliation fails to complete the operation (Op) quickly (e.g., within a threshold timespan). Accordingly, fpolicy flags are handled without going out of sync (e.g., without transition from a synchronous replication state to an asynchronous replication state). In particular, write operations 430 with fpolicy flags are sequentially replicated 434 to the second node 410, as opposed to being replicated in parallel. For example, an operation is replicated to the second node 410 for execution upon the second storage object 412 as a replication operation only after the first node 402 has successfully executed the operation upon the first storage object 404. This avoids potential quick reconciliations from being triggered. Write operations 432 without fpolicy flags will be replicated 436 in parallel for lower latency (e.g., replicated to the second node 410 regardless of whether the write operations 432 have finished executing upon the first storage object 404).

Figure 5:
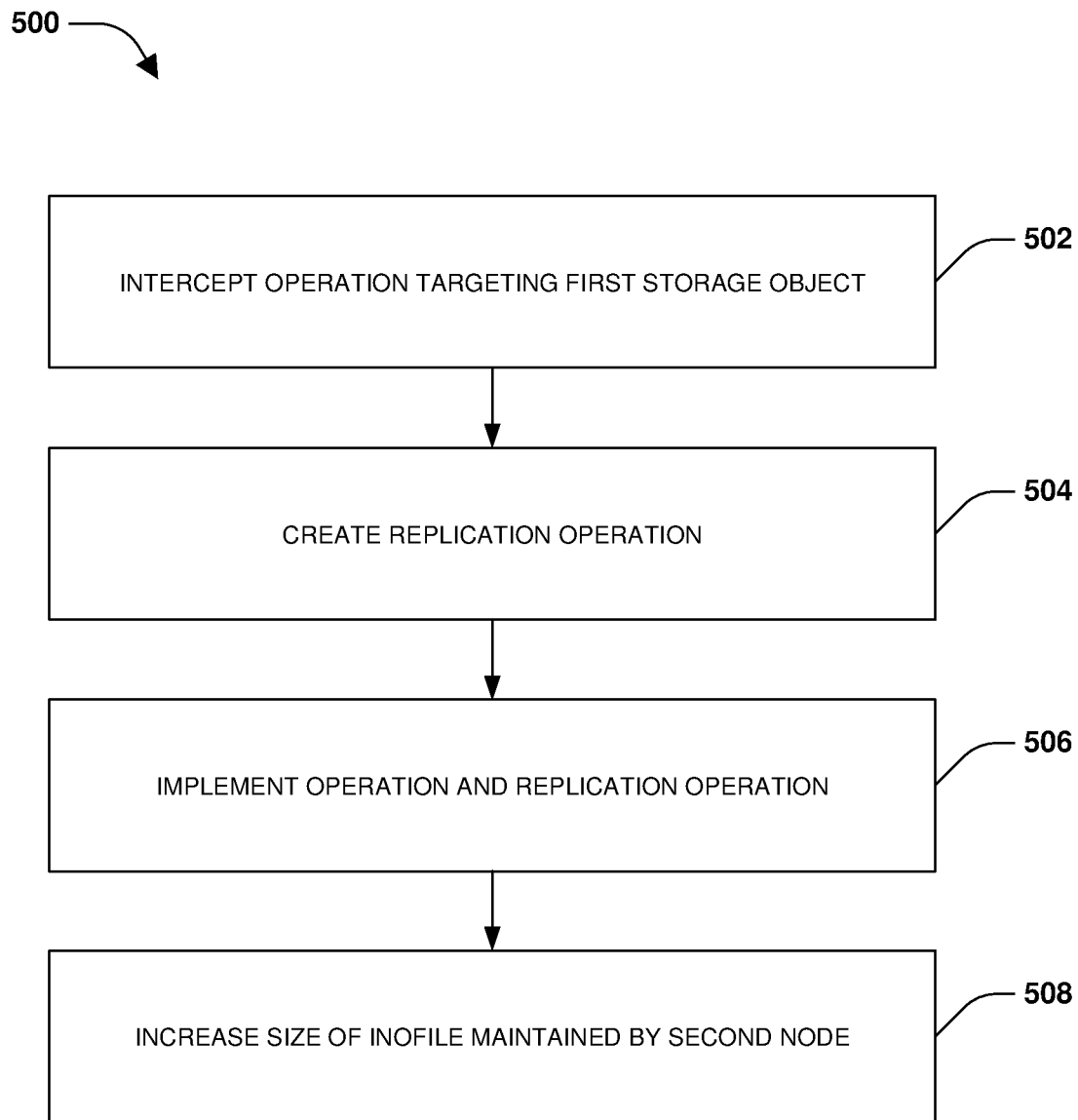
FIG. 5 is a flow chart illustrating an example method for inofile management.
Figure 6A:
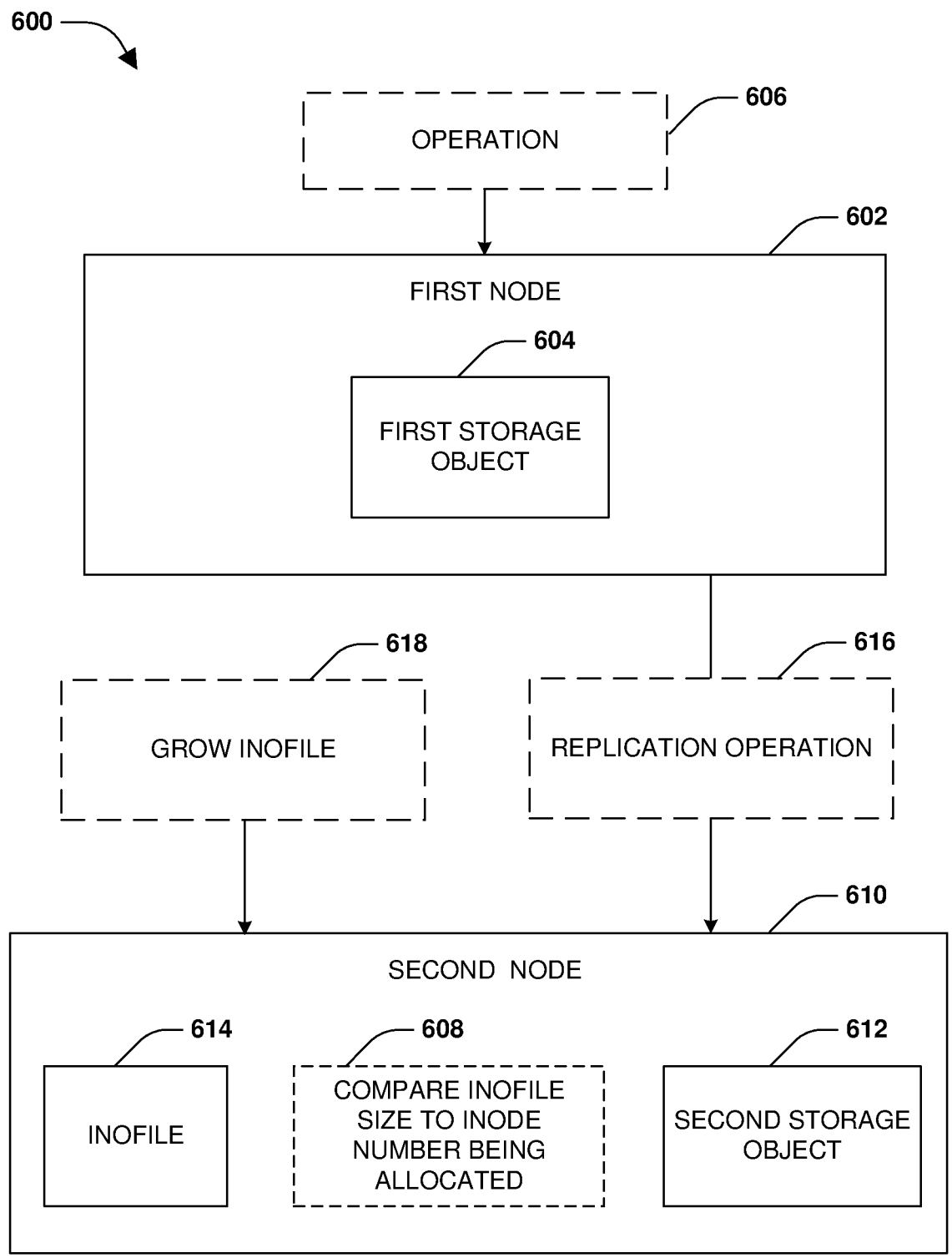
FIG. 6A is a component block diagram illustrating an example system for inofile management, where a size of an inofile is increased.
Figure 6B:
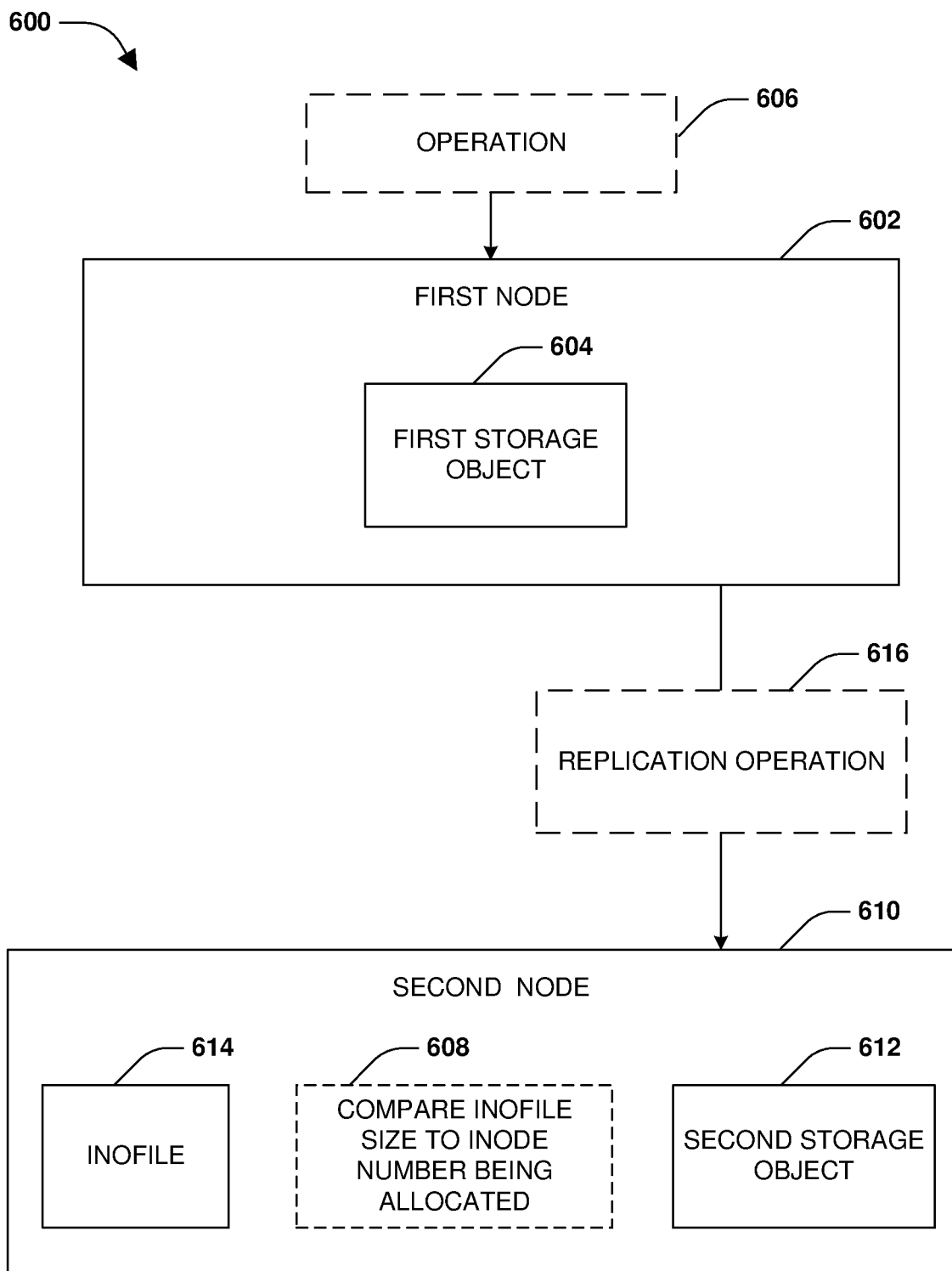
FIG. 6B is a component block diagram illustrating an example system for inofile management, where a size of an inofile is not increased.
Figure 6C:
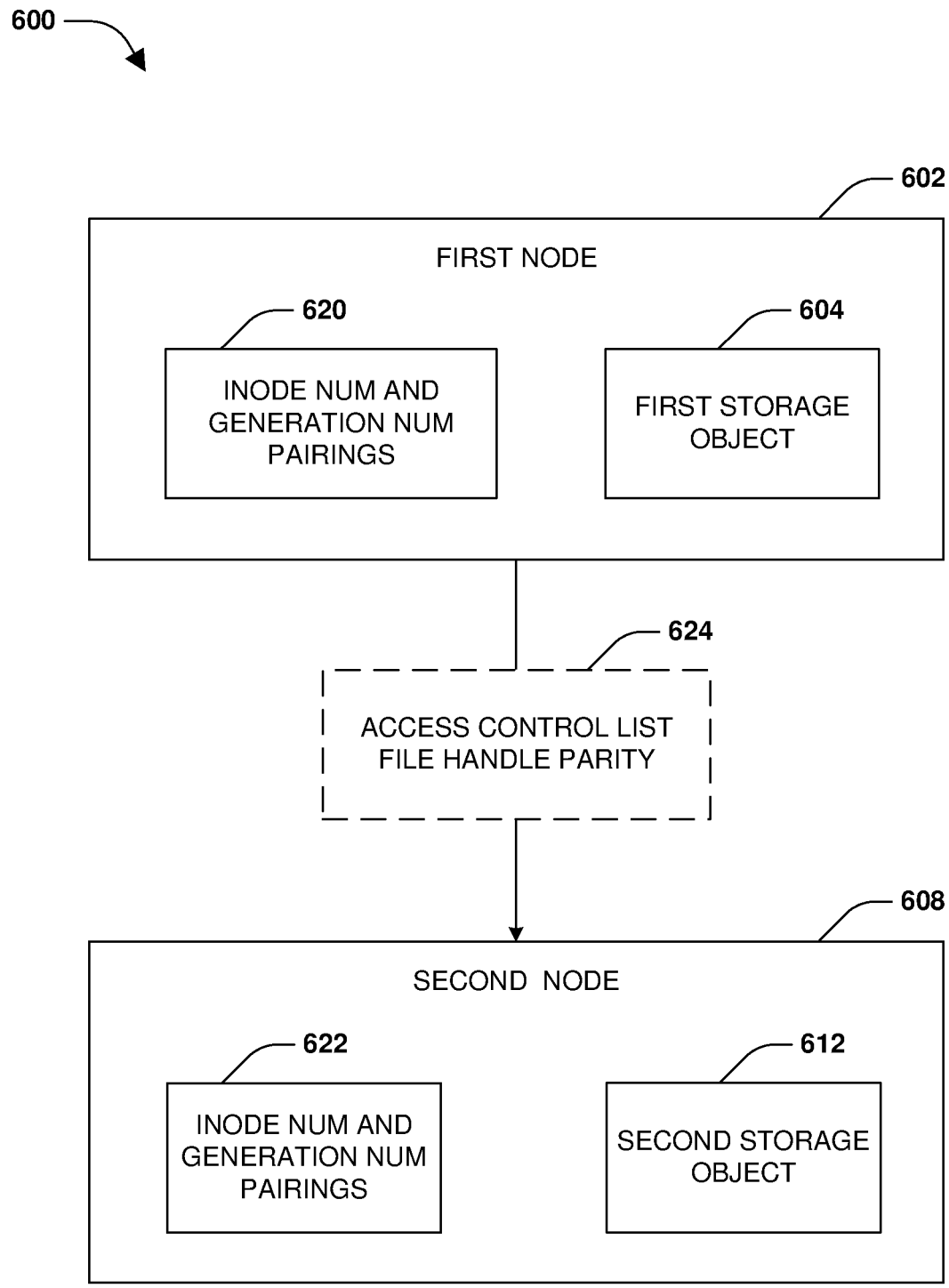
FIG. 6C is a component block diagram illustrating an example system for inofile management, where access control list file handle parity is provided.

One embodiment of inofile management is illustrated by an exemplary method 500 of FIG. 5 and further described in conjunction with system 600 of FIGS. 6A-6C. A first node 602 may store a first storage object 604, as illustrated by FIG. 6A. The first storage object 604 may have a replication relationship with a second storage object 612 stored by a second node 610. The second storage object 612 may be maintained as a replica of the first storage object 604. A splitter component is configured to replicate operations targeting the first storage object 604 to the second storage object 612. While in a synchronous replication state, the splitter component is configured to intercept operations before such operations reach a file system or operating system of the first node 602. The splitter component is configured to split (replicate) an operation to create a replication operation that is transmitted to the second node 610 for execution upon the second storage object 612. The operation is acknowledged back to a device that sent the operation to the first node 602 once execution and replication of the operation are acknowledged.

The first node 602 may maintain an inofile, such as a volume on-disk inofile comprising inode information of storage objects maintained by the first node 602. The second node 610 may maintain an inofile 614, such as a volume on-disk inofile comprising inode information of storage objects maintained by the second node 610. As provided herein, the inofile 614 of the second node 610 is grown on-demand when necessary. In particular, the inofile 614 is grown when an inode number beyond a current inofile size of the inofile 614 is needed to be allocated by a replication operation, such as a create operation being replicated to the second node 610.

In particular, when metadata operations, such as a create operation, is replicated from the first node 602 to the second node 610, the operation will have an inode number and generation number as an identifier of the operation. The identifier is replicated along with the operation to the second node 610. If the inode number is greater than the current inofile size of the inofile 614 (e.g., new data is being created within the second storage object 612 or a new storage object is being created with the new data), then the second node 610 determines that the inode number of the replicated identifier is not found within the inofile 614 because the inode number is beyond the current inofile size of the inofile 614. Accordingly, the second node 610 sends the replication operation back to the first node 602 so that an inofile grow operation can be issued to increase the size of the inofile 614 on-demand to accommodate the replication operation (e.g., as opposed to initially preallocating the inofile 614 to a large size that remains used until needed, which can waste storage space). The inofile 614 can be grown by a unit that is a chunk of inodes, such as multiple inodes, in order to efficiently utilize storage space and avoid frequent path length increase operations.

In an embodiment, the first node 602 receives an operation 606, such as a create operation, at 502. The operation 606 has an identifier specifying an inode number and generation number of data to be created by the create operation. The inode number may correspond to an inode being allocated by the create operation. The operation 606 is replicated as a replication operation 616 comprising a replicated identifier specifying the inode number and generation number, at 504. The first node 602 locally executes the operation 606 and the replication operation 616 is transmitted to the second node 610, at 506.

The second node 610 compares 608 the inode number being allocated to the current size of inofile 614. If the inode number is greater than the current size of the inofile 614, then the second node 610 may return the replication operation 616 back to the first node 602 with an indication that a size of the inofile 614 needs to be increased, as illustrated by FIG. 6A. At 508, the current size of the inofile 614 is grown 618 by either a single inode or by multiple inodes (a chunk of inodes). The replication operation 616 is then executed by the second node 610 based upon the inofile 614 being grown 618. In contrast, if the inode number is less than or equal to the current size of the inofile 614, then the inofile is not grown and the replication operation 616 is executed by the second node 610, as illustrated by FIG. 6B. In this way, the inofile 614 is grown on-demand only as needed.

FIG. 6C illustrates access control list (ACL) file handle parity 624 being implemented for the first node 602 and the second node 610 to avoid inode map lookups at the second node 610, which would otherwise increase latency due to such lookups. The ACL file handle parity 624 corresponds to maintaining parity between inode number and generation number pairings used to reference storage objects (e.g., used as file handles to access storage objects). Access control lists may be implemented as files in a public inode space. Access control lists specify access control entities (ACEs) as content. An access control list allows an external entity, such as a client, to specify access control and permissions for storage objects hosted by nodes.

An incoming operation will specify access control entities. The access control entities are used by the first node 602 to attempt to locate an access control list inode with the same access control entities. If an access control list inode is found that has the same access control entities specified by the incoming operation, then the access control list inode is shared and referenced by the incoming operation. Otherwise, if there is no access control list inode with the same access control entities, a new access control list inode is created/allocated for the incoming operation (e.g., a new file handle is created/allocated). Access control list sharing is a best effort by the first node 602 based upon what access control lists are in memory. In this way, the first node 602 will either share the existing access control list inode or create/allocate a new access control list inode. As provided herein, the second node 610 will be controlled to mimic what the first node 602 did, such as either share or allocate.

An access control list inode may correspond to a file handle for a storage object, which is comprised of an inode number and generation number. Access control list file handle information is replicated from the first node 602 to the second node 610 in order to achieve parity. Thus, if the first node 602 shared or allocated an access control list inode, then the second node 610 will do the same. For example, when an operation is replicated to the second node 610 as a replication operation, the replication operation may specify details of whether an access control list inode number was allocated or shared by the first node 602. Accordingly, a file system operation handler of the second node 610 will bypass default logic of access control list inode number sharing and instead mimic whatever the first node 602 did, such as allocating a new access control list inode (e.g., creating a new access control list inode as a new file handle) or sharing an existing access control list inode of an access control list having the same access control entities of the replication operation. In this way, access control list file handle party 624 is maintained between inode number and generation number pairings 620 maintained by the first node 602 and inode number and generation number pairings 622 maintained by the second node 610 because the second node 610 will either share an existing access control list inode or allocate a new access control list inode based upon whether the first node 602 shared or allocated.

Figure 7:
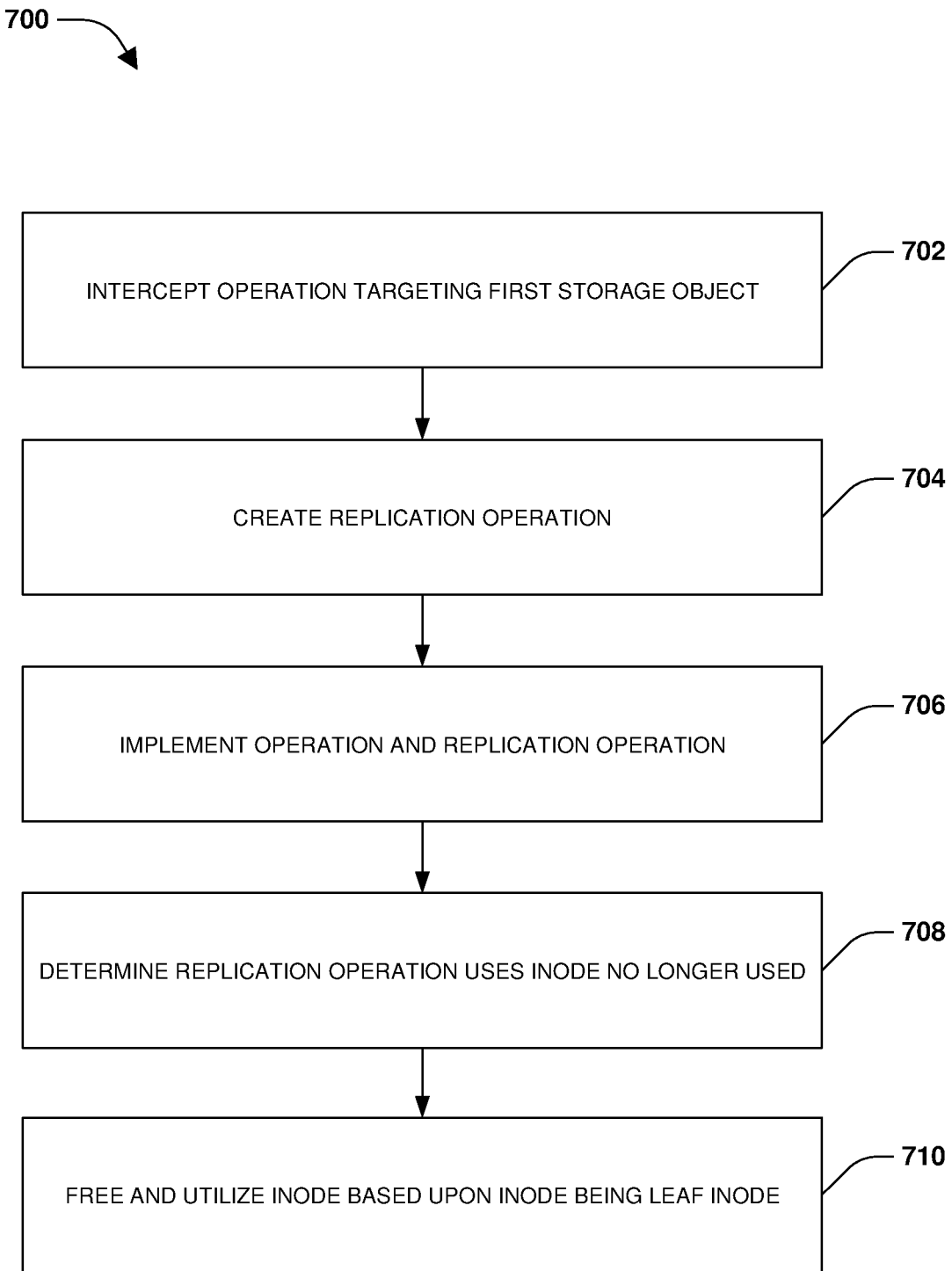
FIG. 7 is a flow chart illustrating an example method for freeing and utilizing unused inodes.
Figure 8:
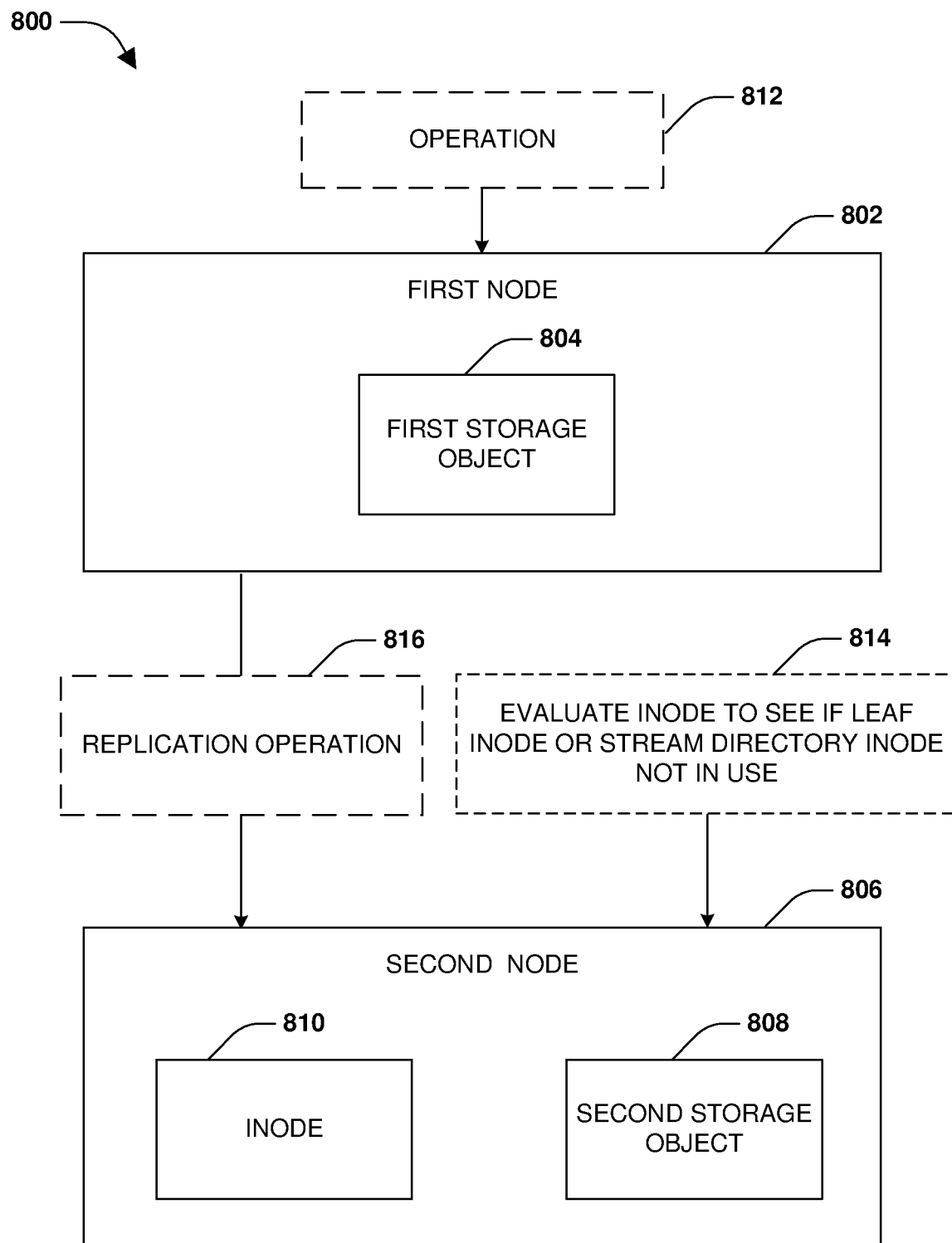
FIG. 8 is a component block diagram illustrating an example system freeing and utilizing unused inodes.

One embodiment of freeing and utilizing unused inodes is illustrated by an exemplary method 700 of FIG. 7 and further described in conjunction with system 800 of FIG. 8. A first node 802 may store a first storage object 804, as illustrated by FIG. 8. The first storage object 804 may have a replication relationship with a second storage object 808 stored by a second node 806. The second storage object 808 may be maintained as a replica of the first storage object 804. A splitter component is configured to replicate operations targeting the first storage object 604 to the second storage object 612. While in a synchronous replication state, the splitter component is configured to intercept operations before such operations reach a file system or operating system of the first node 802. The splitter component is configured to split (replicate) an operation to create a replication operation that is transmitted to the second node 806 for execution upon the second storage object 808. The operation is acknowledged back to a device that sent the operation to the first node 802 once execution and replication of the operation are acknowledged.

A storage environment, comprising the first node 802 and the second node 806, may support alternate data streams. This allows multiple data streams to be associated with a name of the first storage object 804 and/or multiple data streams to be associated with a name of the second storage object 808. A stream name of a data stream identifies a data attribute of a corresponding storage object.

In an embodiment, composite zombie handling is supported for replicating operations from the first node 802 to the second node 806. Composite zombie handling corresponds to freeing and utilizing unused inodes at the second node 806 (e.g., inodes of data no longer used or referenced by storage objects of the second node 806) that have yet to be freed by a composite zombie handler of the second node 806. CIFS supports multiple data streams for a file/directory, where more than one data stream is associated with a filename (e.g., a name of the first storage object). When a file system of the first node 802 unlinks a storage object associated with data streams, a base is deleted and the unlink operation completes immediately. The remaining storage objects are deleted later when a composite zombie handler processes the storage objects. However, the composite zombie handler at the first node 802 can be fast, but a composite zombie handler at the second node 806 can be much slower. Thus, if an inode number is freed and reused by a create operation at the first node 802, then the inode number may not yet be freed at the second node 806 by the composite zombie handler hosted by the second node 806. This will cause a replication operation of the create operation to fail. To avoid the failure, the inode at the second node 806 is hijacked. If the inode is a leaf inode, then the inode is freed up and used immediately for the replicated create operation. If the inode is a stream directory, then the data streams are moved under a new private inode and the inode is released.

In an embodiment, an operation 812, targeting the first storage object 804 of the first node 802, in intercepted, at 702. At 704, a replication operation 816 is created as a replication of the operation 812. At 706, the operation 812 is implemented upon the first storage object 804 by the first node 802. An inode number may be freed and reused by the first node 802 for processing the operation 812. The replication operation 816 may be transmitted to the second node 806 for execution. At 708, a determination is made as to whether the replication operation uses an inode 810 no longer used by storage objects of the second node 806. The determination may include determining that the composite zombie handler of the second node 806 has yet to free the inode 810. The determination may include determining that the replication operation 816 comprises an operation, such as a create operation, targeting the inode 810.

The inode 810 is evaluated 814 to see if the inode 810 is a leaf inode or a stream directory inode not in use. If the inode is a leaf inode, then the inode 810 is freed and utilized for the replication operation 816, at 710, even though the composite zombie handler of the second node 806 has not yet freed the inode 810. If the inode is a stream directory inode, then data streams of the stream directory inode are moved under a new private inode for use by the replication operation 816, and the stream directory inode is released/freed.

Figure 9:
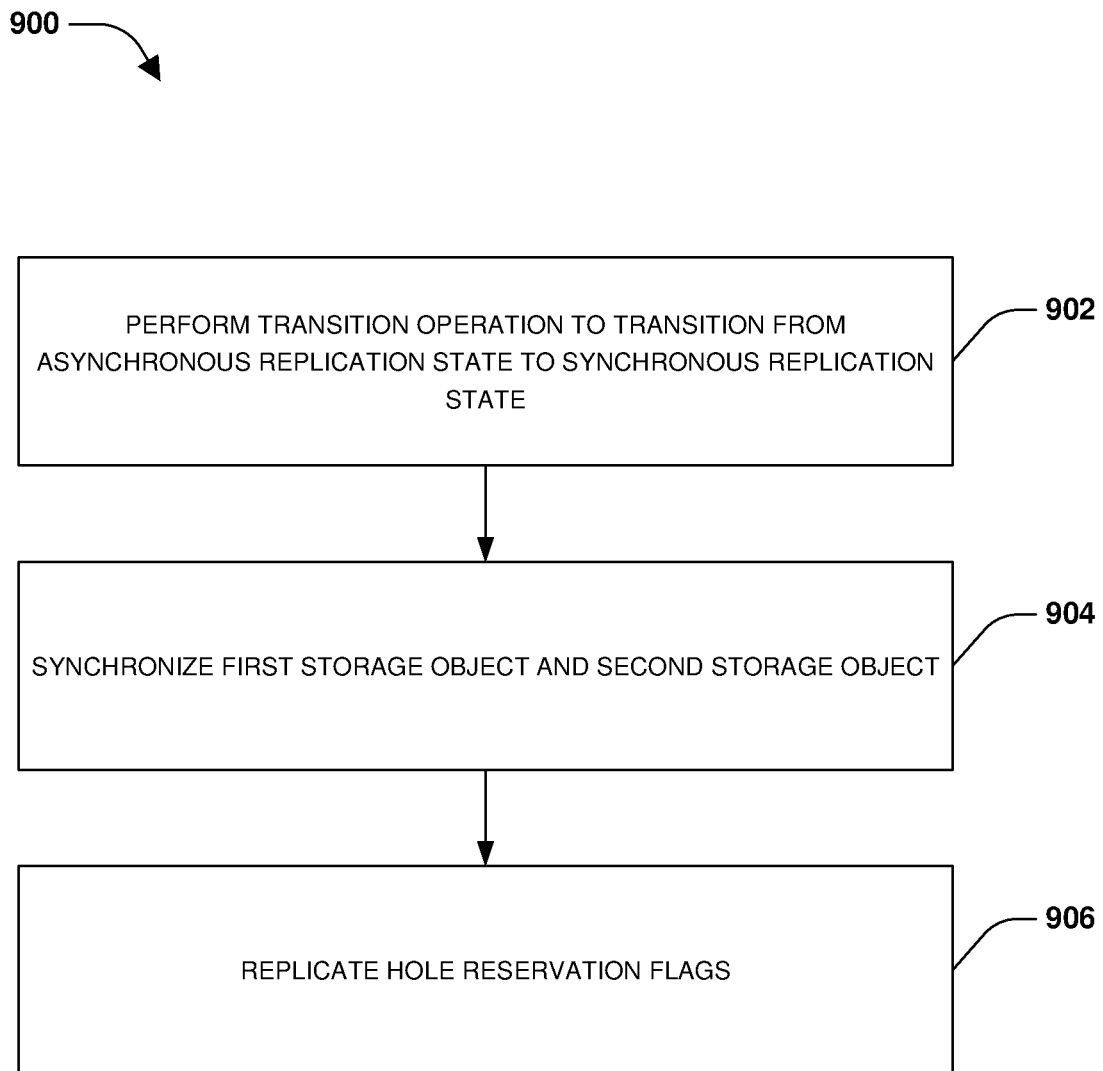
FIG. 9 is a flow chart illustrating an example method for hole preservation.
Figure 10A:
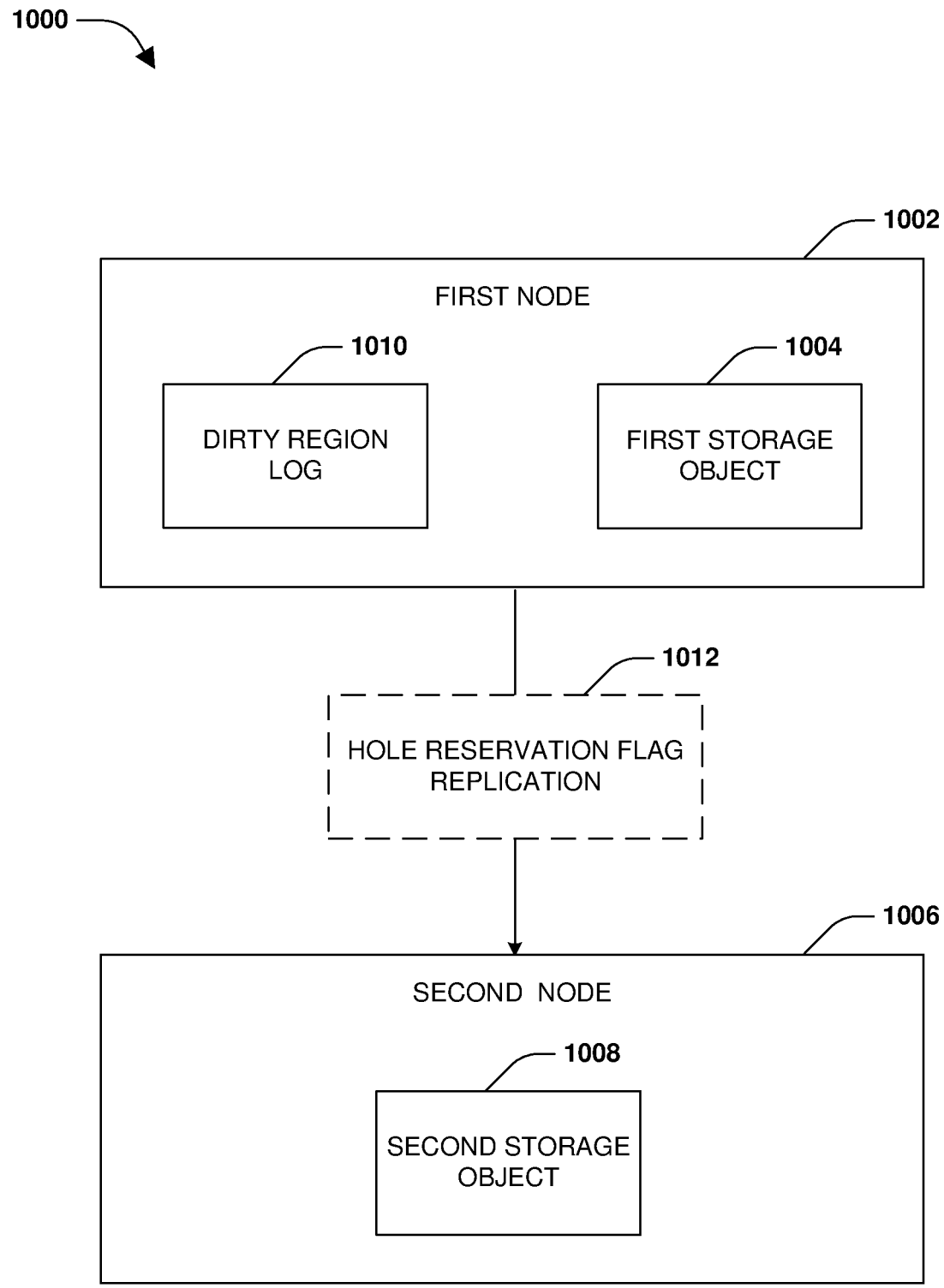
FIG. 10A is a component block diagram illustrating an example system for hole preservation, where hole reservation flags are replicated.
Figure 10B:
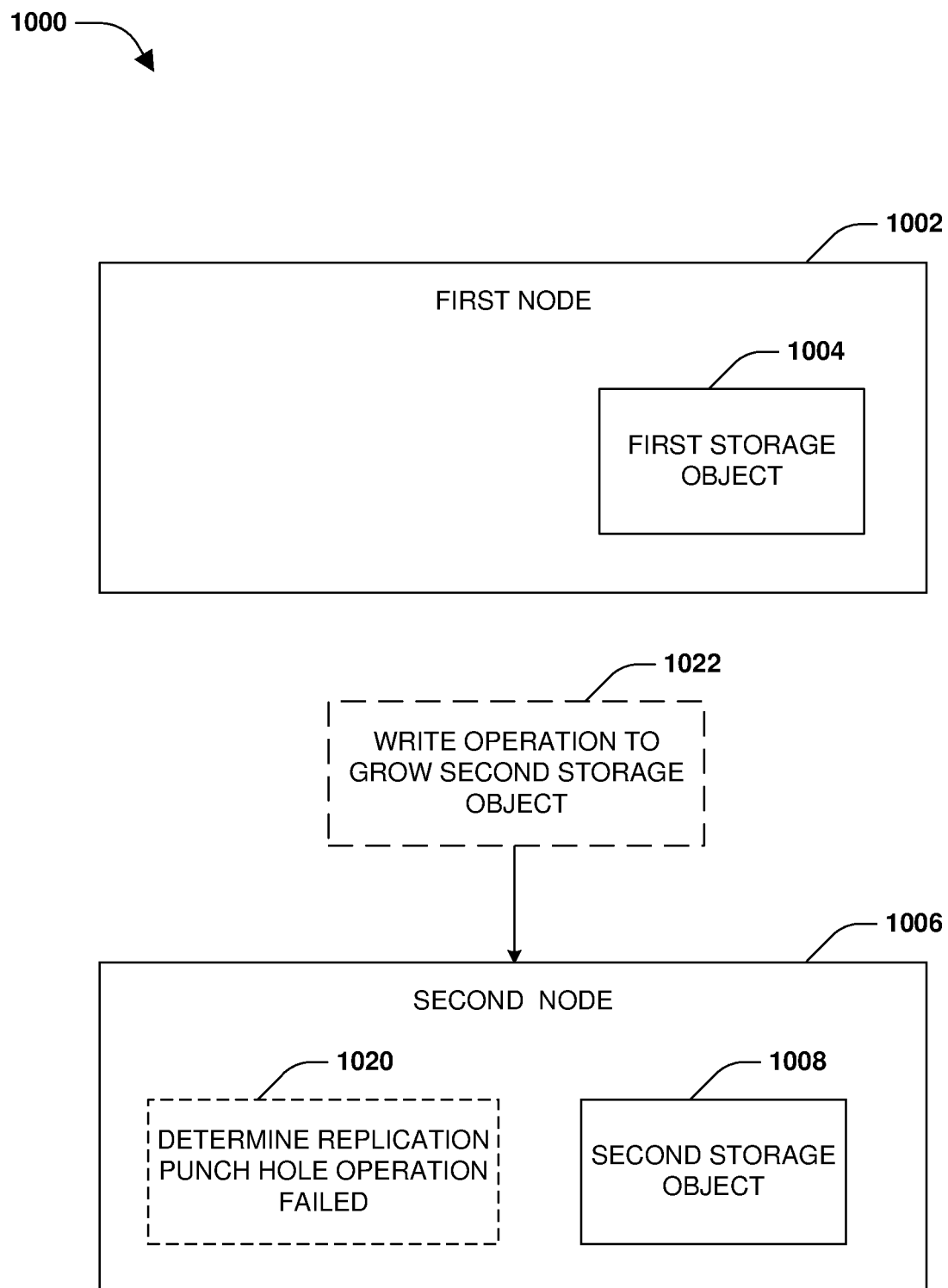
FIG. 10B is a component block diagram illustrating an example system for hole preservation, where a write operation is used to grow a storage object.

One embodiment of freeing and utilizing unused inodes is illustrated by an exemplary method 900 of FIG. 9 and further described in conjunction with system 1000 of FIGS. 10A and 10B. A first node 1002 may store a first storage object 1004, as illustrated by FIG. 10A. The first storage object 1004 may have a replication relationship with a second storage object 1008 stored by a second node 1006. The second storage object 1008 may be maintained as a replica of the first storage object 1004. A splitter component is configured to replicate operations targeting the first storage object 1004 to the second storage object 1008. While in a synchronous replication state, the splitter component is configured to intercept operations before such operations reach a file system or operating system of the first node 1002. The splitter component is configured to split (replicate) an operation to create a replication operation that is transmitted to the second node 1006 for execution upon the second storage object 1008. The operation is acknowledged back to a device that sent the operation to the first node 1002 once execution and replication of the operation are acknowledged.

If the first storage object 1004 and the second storage object 1008 fall out of sync such that incoming operations are not synchronously replicated to the second storage object 1008, a transition operation can be performed to provide non-disruptive re-synchronization between the first node 1002 and the second node 1006. The transition operation can be performed using a dirty region log 1010 to track dirty regions of the first storage object 1004 modified during the transition operation and a metadata log to track metadata operations executed during the transition operation. Dirty data (e.g., modified data of the first storage object 1004 not yet replicated to the second storage object 1008) as identified by the dirty region log 1010 and metadata operations as logged by the metadata log are applied to the second node 1006 to bring the first storage object 1004 and the second storage object 1008 into a synchronous replication relationship. Metadata operations are first replicated from the metadata log, and then the dirty data is replicated.

If a replication operation succeeded at the second node 1006 but a corresponding operation fails at the first node 1002, then a quick reconciliation (quick reconcile) can be performed. The quick reconciliation will undo the replication operation at the second node 1006 using old data from the first node 1002 before responding with a failure. In this way, the first storage object 1004 and the second storage object 1008 will be consistent in that they both will comprise the same old data. A failure message is returned to a client device that issued the operation because the operation and the replication operation were not fully executed and committed to write the new data to the first storage object 1004 and the second storage object 1008. In this way, the synchronous replication relationship can stay in-sync and the first storage object 1004 and the second storage object 1008 are consistent.

In an embodiment, persistent hole reservations are replicated between the first node 1002 and the second node 1006. Common internet file system (CIFS) applications may reserve storage space within storage objects before writing to the storage objects. Certain operations, such as writes and set attributes, can cause persistent hole reservations being on or off based on a hole reservation flag. However, details of the hole reservation flag can be lost during the transition operation because operations are not replicated in order and the dirty region log doesn't have details of the hole reservation flag which can be lost.

At 902, the transition operation is performed to provide non-disruptive re-synchronization between the first node 1002 and the second node 1006. The dirty region log 1010 is used to track dirty regions of the first storage object 1004 modified during the transition operation. A metadata log is used to track metadata operations executed by the first node 1002. During the transition operation, the metadata operations are replicated to the second node 1006. The dirty regions are then replicated to the second storage object 1008. For example, a dirty region read is performed to replicate data of a dirty region to the second storage object 1008. The dirty region log scan induced read evaluates an inode associated with the dirty region to determine whether a hole reservation flag is set. The data of the dirty region and the hole reservation flag are replicated to the second storage object 1008 based upon the hole reservation flag being set.

At 904, the first storage object 1004 and the second storage object 1008 are synchronized (e.g., replication of logged metadata operations, and then replication of dirty data). During the transition operation, hole reservation flags of operations targeting the first storage object 1004 are replicated 1012 within replication operations targeting the second storage object 1008 so that the hole reservation flags are not lost at the second node 1006, at 906. In an example, a component (e.g., a read handler, a set attribute handler, etc.) will detect if an inode has a hole reservation flag, and will set a space reservation attribute that is transmitted to the second node 1006 to reserve corresponding storage space within the second storage object 1008. For a dirty region log induced read, if a hole reservation flag is set, then the hole reservation flag is set for a write operation being sent to the second node 1006 to reserve corresponding storage space within the second storage object 1008.

When an operation fails to execute upon the first storage object 1004 but a corresponding replication operation succeeds at the second storage object 1008, the quick reconciliation is performed. During the quick reconciliation, read operations to the second node 1006 are modified to convey a presence of hole reservation flags. The quick reconciliation (QR) induced operations of Write and PunchHole to the second node 1006 will have hole reservation flags if inodes at the first node 1002 had the hole reservation flags. In this way, hole reservation flags are conveyed/replicated 1012 to the second node 1006 notwithstanding the quick reconciliation so that the second node 1006 can reserve storage space within the second storage object 1008 corresponding to reserved storage space within the first storage object 1004.

FIG. 10B illustrates failure handling 1020 for punch hole operations. During a steady state of synchronous replication, punched holes are forwarded from the first node 1002 to the second node 1006. That is, the first node 1002 may hole punch unused data blocks of the first storage object 1004 so that the unused data blocks can be returned to a storage array for storing other data. While in the steady state of synchronous replication, it may be easy to merely forward punch hole operations to the first node 1002 and the second node 1006 for freeing unused data blocks back to the storage array. However, issues can occur during the transition operation where operations are not being sequentially replicated, and thus a hole punch operation could attempt to free a block that is beyond an end of the second storage object 1008 and will fail. Accordingly, when the hole punch operation fails at the second node 1006, then the hole punch operation is returned to a replication layer thread at the second node 1006 that will issue a write 1022 to the block targeted by the hole punch operation (e.g., a last block number as specified by the hole punch operation) in order to grow the second storage object 1008 so that the hole punch operation can be re-issued. The re-issued hole punch operation will succeed because the second storage object 1008 has been grown to encompass the last block number targeted by the hole punch operation.

Figure 11:
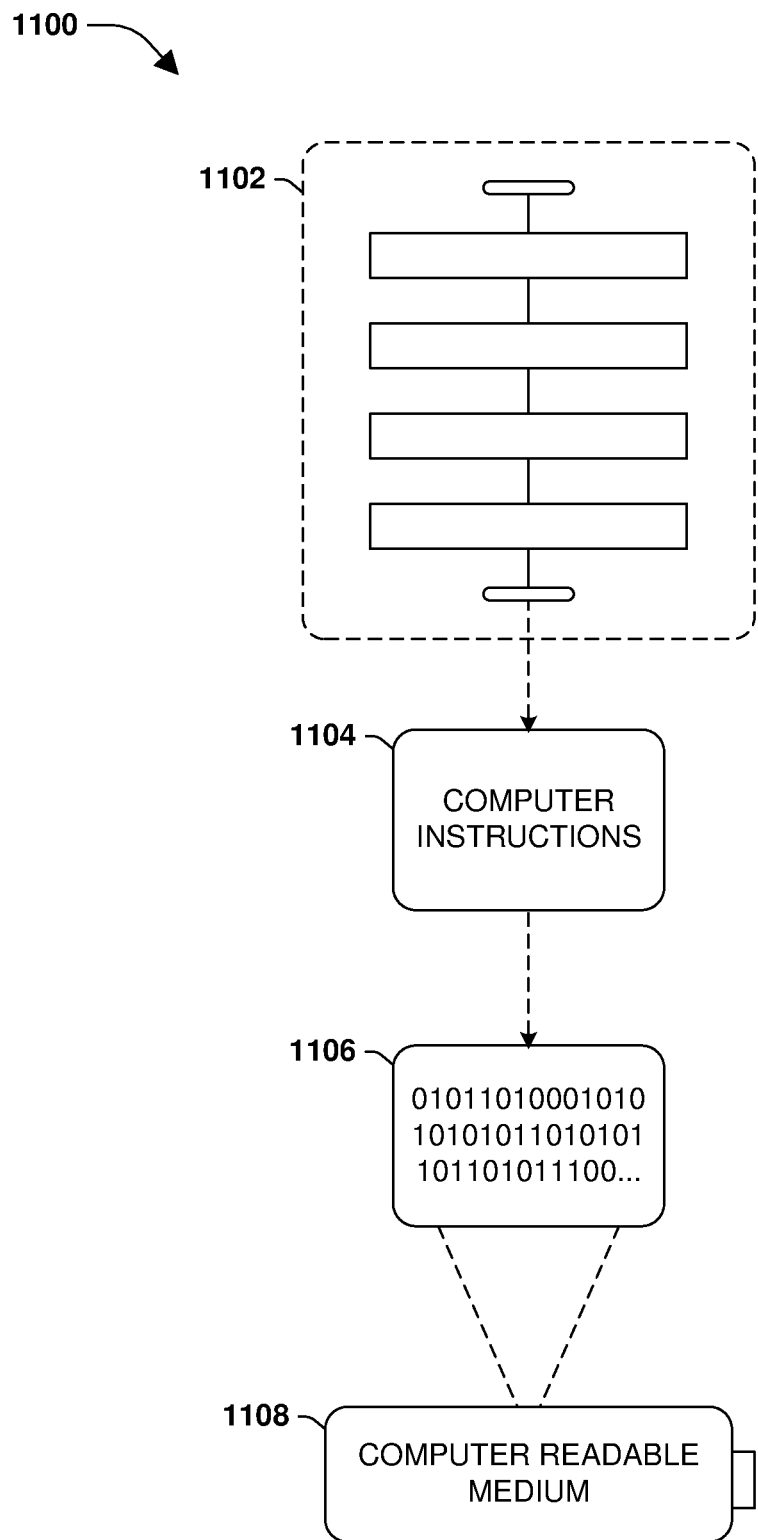
FIG. 11 is an example of a computer readable medium in which an embodiment of the invention may be implemented.

Still another embodiment involves a computer-readable medium 1100 comprising processor-executable instructions configured to implement one or more of the techniques presented herein. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises a processor-executable computer instructions 1104 configured to operate according to one or more of the principles set forth herein. In some embodiments, the processor-executable computer instructions 1104 are configured to perform a method 1102, such as at least some of the exemplary method 300 of FIG. 3, at least some of the exemplary method 500 of FIG. 5, at least some of the exemplary method 700 of FIG. 7, and/or at least some of the exemplary method 900 of FIG. 9, for example. In some embodiments, the processor-executable computer instructions 1104 are configured to implement a system, such as at least some of the exemplary system 400, at least some of the exemplary system 600, at least some of the exemplary system 800, and/or at least some of the exemplary system 1000, for example. Many such computer-readable media are contemplated to operate in accordance with the techniques presented herein.

Figure 12:
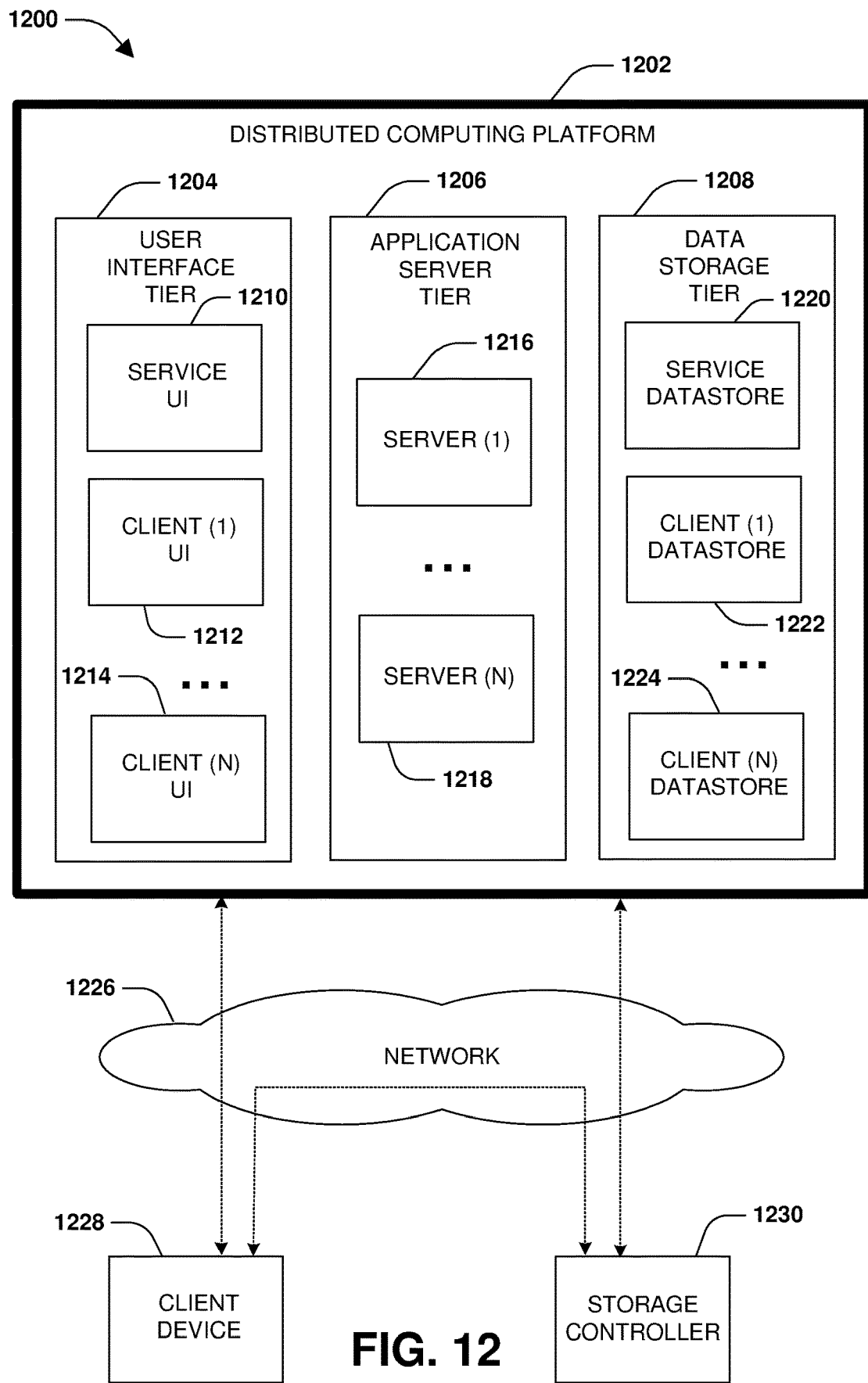
FIG. 12 is a component block diagram illustrating an example computing environment in which an embodiment of the invention may be implemented.

FIG. 12 is a diagram illustrating an example operating environment 1200 in which an embodiment of the techniques described herein may be implemented. In one example, the techniques described herein may be implemented within a client device 1228, such as a laptop, tablet, personal computer, mobile device, wearable device, etc. In another example, the techniques described herein may be implemented within a storage controller 1230, such as a node configured to manage the storage and access to data on behalf of the client device 1228 and/or other client devices. In another example, the techniques described herein may be implemented within a distributed computing platform 1202 such as a cloud computing environment (e.g., a cloud storage environment, a multi-tenant platform, etc.) configured to manage the storage and access to data on behalf of the client device 1228 and/or other client devices.

In yet another example, at least some of the techniques described herein are implemented across one or more of the client device 1228, the storage controller 1230, and the distributed computing platform 1202. For example, the client device 1228 may transmit operations, such as data operations to read data and write data and metadata operations (e.g., a create file operation, a rename directory operation, a resize operation, a set attribute operation, etc.), over a network 1226 to the storage controller 1230 for implementation by the storage controller 1230 upon storage. The storage controller 1230 may store data associated with the operations within volumes or other data objects/structures hosted within locally attached storage, remote storage hosted by other computing devices accessible over the network 1226, storage provided by the distributed computing platform 1202, etc. The storage controller 1230 may replicate the data and/or the operations to other computing devices so that one or more replicas, such as a destination storage volume that is maintained as a replica of a source storage volume, are maintained. Such replicas can be used for disaster recovery and failover.

The storage controller 1230 may store the data or a portion thereof within storage hosted by the distributed computing platform 1202 by transmitting the data to the distributed computing platform 1202. In one example, the storage controller 1230 may locally store frequently accessed data within locally attached storage. Less frequently accessed data may be transmitted to the distributed computing platform 1202 for storage within a data storage tier 1208. The data storage tier 1208 may store data within a service data store 1220, and may store client specific data within client data stores assigned to such clients such as a client (1) data store 1222 used to store data of a client (1) and a client (N) data store 1224 used to store data of a client (N). The data stores may be physical storage devices or may be defined as logical storage, such as a virtual volume, LUNs, or other logical organizations of data that can be defined across one or more physical storage devices. In another example, the storage controller 1230 transmits and stores all client data to the distributed computing platform 1202. In yet another example, the client device 1228 transmits and stores the data directly to the distributed computing platform 1202 without the use of the storage controller 1230.

The management of storage and access to data can be performed by one or more storage virtual machines (SVMs) or other storage applications that provide software as a service (SaaS) such as storage software services. In one example, an SVM may be hosted within the client device 1228, within the storage controller 1230, or within the distributed computing platform 1202 such as by the application server tier 1206. In another example, one or more SVMs may be hosted across one or more of the client device 1228, the storage controller 1230, and the distributed computing platform 1202.

In one example of the distributed computing platform 1202, one or more SVMs may be hosted by the application server tier 1206. For example, a server (1) 1216 is configured to host SVMs used to execute applications such as storage applications that manage the storage of data of the client (1) within the client (1) data store 1222. Thus, an SVM executing on the server (1) 1216 may receive data and/or operations from the client device 1228 and/or the storage controller 1230 over the network 1226. The SVM executes a storage application to process the operations and/or store the data within the client (1) data store 1222. The SVM may transmit a response back to the client device 1228 and/or the storage controller 1230 over the network 1226, such as a success message or an error message. In this way, the application server tier 1206 may host SVMs, services, and/or other storage applications using the server (1) 1216, the server (N) 1218, etc.

A user interface tier 1204 of the distributed computing platform 1202 may provide the client device 1228 and/or the storage controller 1230 with access to user interfaces associated with the storage and access of data and/or other services provided by the distributed computing platform 1202. In an example, a service user interface 1210 may be accessible from the distributed computing platform 1202 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 1212, a client (N) user interface 1214, etc. The client (1) can access various services and resources subscribed to by the client (1) through the client (1) user interface 1212, such as access to a web service, a development environment, a human resource application, a warehouse tracking application, and/or other services and resources provided by the application server tier 1206, which may use data stored within the data storage tier 1208.

The client device 1228 and/or the storage controller 1230 may subscribe to certain types and amounts of services and resources provided by the distributed computing platform 1202. For example, the client device 1228 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 1230 can establish a subscription to have access to certain services and resources of the distributed computing platform 1202.

As shown, a variety of clients, such as the client device 1228 and the storage controller 1230, incorporating and/or incorporated into a variety of computing devices may communicate with the distributed computing platform 1202 through one or more networks, such as the network 1226. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 1202, such as a multi-tenant business data processing platform or cloud computing environment, may include multiple processing tiers, including the user interface tier 1204, the application server tier 1206, and a data storage tier 1208. The user interface tier 1204 may maintain multiple user interfaces, including graphical user interfaces and/or web-based interfaces. The user interfaces may include the service user interface 1210 for a service to provide access to applications and data for a client (e.g., a "tenant") of the service, as well as one or more user interfaces that have been specialized/ customized in accordance with user specific requirements, which may be accessed via one or more APIs.

The service user interface 1210 may include components enabling a tenant to administer the tenant's participation in the functions and capabilities provided by the distributed computing platform 1202, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 1208 may include one or more data stores, which may include the service data store 1220 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 1202 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   intercepting an operation targeting a first storage object, stored by a first node, having a replication relationship with a second storage object stored by a second node;
   creating a replication operation that is a replication of the operation;
   implementing the operation upon the first storage object and the replication operation upon the second storage object while maintaining access control list (ACL) file handle parity between the first storage object and the second storage object by:
      bypassing, by a file system operation handler of the second node, default access control list inode number sharing functionality of the file system operation handler and instead performing, by the file system operation handler, an access control list inode operation specified by the replication operation.

2. The method of claim 1, wherein the maintaining comprises:
   maintaining parity between inode number and generation number pairings between the first node and the second node for the first storage object and the second storage object.

3. The method of claim 1, wherein the maintaining comprises:
   replicating access control list (ACL) file handle information to the second storage object.

4. The method of claim 3, wherein the ACL file handle information specifies that an ACL number was allocated by the operation.

5. The method of claim 3, wherein the ACL file handle information specifies that an ACL number was shared by the operation.

6. The method of claim 3, wherein the ACL file handle information specifies that an ACL number was used by the operation.

7. The method of claim 1, wherein the ACL file handle parity corresponds to replicating a file handle used to reference the first storage object to the second node for referencing the second storage object.

8. The method of claim 1, comprising:
maintaining an access control list within a public inode space; and
populating the access control list with an access control entity associated with an access control list inode as a file handle for the first storage object.

9. A non-transitory machine readable medium comprising instructions for performing a method, which when executed by a machine, causes the machine to:
intercept an operation targeting a first storage object, stored by a first node, having a replication relationship with a second storage object stored by a second node;
create a replication operation that is a replication of the operation;
implement the operation upon the first storage object and the replication operation upon the second storage object while maintaining access control list (ACL) file handle parity between the first storage object and the second storage object by:
bypassing, by a file system operation handler of the second node, default access control list inode number sharing functionality of the file system operation handler and instead performing, by the file system operation handler, an access control list inode operation specified by the replication operation.

10. The non-transitory machine readable medium of claim 9, wherein the instructions cause the machine to:
maintain parity between inode number and generation number pairings between the first node and the second node for the first storage object and the second storage object.

11. The non-transitory machine readable medium of claim 9, wherein the instructions cause the machine to:
replicate access control list (ACL) file handle information to the second storage object.

12. The non-transitory machine readable medium of claim 11, wherein the ACL file handle information specifies that an ACL number was allocated by the operation.

13. The non-transitory machine readable medium of claim 11, wherein the ACL file handle information specifies that an ACL number was shared by the operation.

14. The non-transitory machine readable medium of claim 11, wherein the ACL file handle information specifies that an ACL number was used by the operation.

15. The non-transitory machine readable medium of claim 9, wherein the ACL file handle parity corresponds to replicating a file handle used to reference the first storage object to the second node for referencing the second storage object.

16. The non-transitory machine readable medium of claim 9, wherein the instructions cause the machine to:
maintain access control list within a public inode space; and
populate the access control list with an access control entity associated with an access control list inode as a file handle for the first storage object.

17. A computing device comprising:
a memory comprising machine executable code for performing a method; and
a processor coupled to the memory, the processor configured to execute the machine executable code to cause the processor to:
intercept an operation targeting a first storage object, stored by a first node, having a replication relationship with a second storage object stored by a second node;
create a replication operation that is a replication of the operation;
implement the operation upon the first storage object and the replication operation upon the second storage object while maintaining access control list (ACL) file handle parity between the first storage object and the second storage object by:
bypassing, by a file system operation handler of the second node, default access control list inode number sharing functionality of the file system operation handler and instead performing, by the file system operation handler, an access control list inode operation specified by the replication operation.

18. The computing device of claim 17, wherein the machine executable code causes the processor to:
maintain parity between inode number and generation number pairings between the first node and the second node for the first storage object and the second storage object.

19. The computing device of claim 17, wherein the machine executable code causes the processor to:
replicate access control list (ACL) file handle information to the second storage object.

20. The computing device of claim 19, wherein the ACL file handle information specifies that an ACL number was allocated by the operation.

* * * * *